US012363376B2

(12) United States Patent
Maltar et al.

(10) Patent No.: US 12,363,376 B2
(45) Date of Patent: Jul. 15, 2025

(54) SYSTEMS AND METHODS FOR IDENTIFYING AND STORING A PORTION OF A MEDIA ASSET

(71) Applicant: Adeia Guides Inc., San Jose, CA (US)

(72) Inventors: Paul Maltar, Los Angeles, CA (US); Milan Patel, Santa Clara, CA (US); Yong Gong, West Hills, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/084,349

(22) Filed: Dec. 19, 2022

(65) Prior Publication Data

US 2023/0247251 A1 Aug. 3, 2023

Related U.S. Application Data

(63) Continuation of application No. 17/197,728, filed on Mar. 10, 2021, now Pat. No. 11,563,999, which is a
(Continued)

(51) Int. Cl.
*H04N 7/173* (2011.01)
*G06F 16/48* (2019.01)
(Continued)

(52) U.S. Cl.
CPC ......... *H04N 21/4334* (2013.01); *G06F 16/48* (2019.01); *G06F 16/739* (2019.01);
(Continued)

(58) Field of Classification Search
CPC ......... H04N 21/4334; H04N 21/42203; H04N 21/4532; H04N 21/47214; H04N 21/8352;
(Continued)

(56) References Cited

U.S. PATENT DOCUMENTS 5,179,439 A 1/1993 Hashimoto
5,469,206 A 11/1995 Strubbe et al.
(Continued)

FOREIGN PATENT DOCUMENTS

JP 2007306279 A 11/2007
JP 2010537585 A 12/2010
(Continued)

OTHER PUBLICATIONS

Anonymous: "Cut part from video file", Anonymous: "Cut part from video file from start position to end position with FFmpeg—Super User", Mar. 16, 2015 (Mar. 16, 2015), pp. 1-3, XP055782254 [retrieved on Mar. 4, 2021], 3 pages.
(Continued)

*Primary Examiner* — Annan Q Shang
(74) *Attorney, Agent, or Firm* — Haley Guiliano LLP

(57) ABSTRACT

Systems and methods are described herein for a media guidance application that can cause a specific portion of a media asset to be stored based on a user command. For example, if the user requests the closing scene from a given movie, the media guidance application may detect the command, determine that it comprises an instruction to store a portion of a media asset, identify a source of the portion of the media asset, and cause the portion of the media asset to be stored. The media guidance application may also cause the entirety of the media asset to be stored and initiate playback at the start of the requested portion. This may allow users to store and watch portions of particular interest without requiring that the users seek through the entire media asset on their own.

20 Claims, 10 Drawing Sheets

Related U.S. Application Data continuation of application No. 16/518,584, filed on Jul. 22, 2019, now Pat. No. 10,979,762, which is a continuation of application No. 15/604,403, filed on May 24, 2017, now Pat. No. 10,425,680, which is a continuation of application No. 15/195,530, filed on Jun. 28, 2016, now Pat. No. 9,668,014, which is a continuation of application No. 14/673,493, filed on Mar. 30, 2015, now Pat. No. 9,392,324.

(51) Int. Cl.
| | |
|---|---|
| G06F 16/738 | (2019.01) |
| G10L 15/10 | (2006.01) |
| G10L 17/22 | (2013.01) |
| H04N 21/422 | (2011.01) |
| H04N 21/433 | (2011.01) |
| H04N 21/45 | (2011.01) |
| H04N 21/472 | (2011.01) |
| H04N 21/8352 | (2011.01) |
| H04N 21/845 | (2011.01) |
| H04N 21/8549 | (2011.01) |
| G10L 15/22 | (2006.01) |

(52) U.S. Cl.
CPC .............. *G10L 15/10* (2013.01); *G10L 17/22* (2013.01); *H04N 21/42203* (2013.01); *H04N 21/4532* (2013.01); *H04N 21/47214* (2013.01); *H04N 21/8352* (2013.01); *H04N 21/8455* (2013.01); *H04N 21/8456* (2013.01); *H04N 21/8549* (2013.01); *G10L 2015/223* (2013.01)

(58) Field of Classification Search
CPC ........... H04N 21/8455; H04N 21/8456; H04N 21/8549; G06F 16/48; G06F 16/739; G10L 15/10; G10L 17/22; G10L 2015/223
See application file for complete search history.

(56) References Cited

U.S. PATENT DOCUMENTS

| | | | |
|---|---|---|---|
| 5,483,278 A | 1/1996 | Strubbe et al. | |
| 5,521,589 A | 5/1996 | Mondrosch et al. | |
| 5,619,247 A | 4/1997 | Russo | |
| 5,619,274 A | 4/1997 | Roop et al. | |
| 5,692,214 A | 11/1997 | Levine | |
| 5,758,257 A | 5/1998 | Herz et al. | |
| 5,781,246 A | 7/1998 | Alten et al. | |
| 5,798,785 A | 8/1998 | Hendricks et al. | |
| 6,005,565 A * | 12/1999 | Legall ................ | H04N 21/4622 715/969 |
| 6,141,488 A | 10/2000 | Knudson et al. | |
| 6,239,794 B1 | 5/2001 | Yuen et al. | |
| 6,324,338 B1 | 11/2001 | Wood et al. | |
| 6,370,543 B2 | 4/2002 | Hoffert et al. | |
| 6,388,714 B1 | 5/2002 | Schein et al. | |
| 6,564,378 B1 | 5/2003 | Satterfield et al. | |
| 6,732,369 B1 | 5/2004 | Schein et al. | |
| 6,756,997 B1 | 6/2004 | Ward et al. | |
| 7,165,098 B1 | 1/2007 | Boyer et al. | |
| 7,174,293 B2 | 2/2007 | Kenyon et al. | |
| 7,185,355 B1 | 2/2007 | Ellis et al. | |
| 7,222,073 B2 | 5/2007 | Julia et al. | |
| 7,308,408 B1 | 12/2007 | Stifelman et al. | |
| 7,460,762 B2 | 12/2008 | Godtland et al. | |
| 7,526,506 B2 | 4/2009 | Cho et al. | |
| 7,761,892 B2 | 7/2010 | Ellis et al. | |
| 8,046,801 B2 | 10/2011 | Ellis et al. | |
| 8,316,394 B2 | 11/2012 | Yates | |
| 8,369,680 B2 | 2/2013 | Whiteing | |
| 8,484,226 B2 | 7/2013 | Elliott-Mccrea et al. | |
| 8,504,373 B2 | 8/2013 | Bansal et al. | |
| 9,392,324 B1 | 7/2016 | Maltar et al. | |
| 9,668,014 B2 | 5/2017 | Maltar et al. | |
| 9,881,255 B1 * | 1/2018 | Castellanos ......... | G06F 16/9574 |
| 9,911,421 B2 | 3/2018 | Tsujikawa et al. | |
| 10,041,936 B2 | 8/2018 | Isacoff et al. | |
| 10,425,680 B2 | 9/2019 | Maltar et al. | |
| 10,483,003 B1 | 11/2019 | Mcnair et al. | |
| 10,698,942 B2 | 6/2020 | Kuznetsov | |
| 2002/0042923 A1 | 4/2002 | Asmussen et al. | |
| 2002/0120925 A1 | 8/2002 | Logan | |
| 2002/0174430 A1 | 11/2002 | Ellis et al. | |
| 2003/0110499 A1 | 6/2003 | Knudson et al. | |
| 2003/0229900 A1 | 12/2003 | Reisman | |
| 2004/0111745 A1 | 6/2004 | Schein et al. | |
| 2004/0186714 A1 | 9/2004 | Baker | |
| 2005/0172319 A1 | 8/2005 | Reichardt et al. | |
| 2005/0251827 A1 | 11/2005 | Ellis et al. | |
| 2006/0004871 A1 * | 1/2006 | Hayama ................ | G06F 16/73 |
| 2006/0041926 A1 | 2/2006 | Istvan et al. | |
| 2007/0118857 A1 | 5/2007 | Chen et al. | |
| 2007/0212023 A1 * | 9/2007 | Whillock ........... | H04N 21/4532 386/281 |
| 2007/0240072 A1 | 10/2007 | Cunningham et al. | |
| 2007/0255565 A1 | 11/2007 | Yu et al. | |
| 2008/0046954 A1 | 2/2008 | Bhogal et al. | |
| 2008/0115161 A1 * | 5/2008 | Kurzion ................ | G06Q 30/02 725/62 |
| 2008/0139990 A1 | 6/2008 | Till et al. | |
| 2008/0167872 A1 | 7/2008 | Okimoto et al. | |
| 2008/0168340 A1 | 7/2008 | Jang | |
| 2008/0184305 A1 | 7/2008 | Schein et al. | |
| 2008/0189744 A1 | 8/2008 | Schein et al. | |
| 2008/0263600 A1 * | 10/2008 | Olague .............. | H04N 7/17318 725/38 |
| 2008/0270110 A1 | 10/2008 | Yurick et al. | |
| 2008/0270344 A1 | 10/2008 | Yurick et al. | |
| 2009/0100478 A1 | 4/2009 | Craner et al. | |
| 2009/0133059 A1 | 5/2009 | Gibbs et al. | |
| 2009/0177644 A1 | 7/2009 | Martinez et al. | |
| 2009/0178093 A1 * | 7/2009 | Mitsuji .............. | H04N 21/8355 725/104 |
| 2009/0183223 A1 | 7/2009 | Maeda et al. | |
| 2010/0153885 A1 | 6/2010 | Yates | |
| 2010/0158391 A1 | 6/2010 | Cunningham et al. | |
| 2010/0306249 A1 | 12/2010 | Hill et al. | |
| 2010/0333137 A1 | 12/2010 | Hamano et al. | |
| 2011/0107215 A1 | 5/2011 | Klappert | |
| 2011/0119715 A1 | 5/2011 | Chang et al. | |
| 2011/0122255 A1 | 5/2011 | Haritaoglu | |
| 2011/0131595 A1 | 6/2011 | Xue et al. | |
| 2011/0185387 A1 | 7/2011 | Schein et al. | |
| 2011/0209170 A1 | 8/2011 | Schein et al. | |
| 2011/0213655 A1 | 9/2011 | Henkin et al. | |
| 2011/0246937 A1 | 10/2011 | Roberts et al. | |
| 2011/0289533 A1 | 11/2011 | White et al. | |
| 2012/0008821 A1 | 1/2012 | Sharon et al. | |
| 2012/0117082 A1 | 5/2012 | Koperda et al. | |
| 2012/0131628 A1 | 5/2012 | Janning et al. | |
| 2012/0144499 A1 * | 6/2012 | Tan ....................... | G06Q 10/00 707/E17.061 |
| 2012/0169825 A1 | 7/2012 | Patel | |
| 2012/0226981 A1 | 9/2012 | Clavin | |
| 2013/0103681 A1 | 4/2013 | Renders et al. | |
| 2013/0145387 A1 | 6/2013 | Van et al. | |
| 2013/0211842 A1 | 8/2013 | Edgar et al. | |
| 2013/0227074 A1 | 8/2013 | Odlund et al. | |
| 2013/0290845 A1 | 10/2013 | Rudman et al. | |
| 2013/0311487 A1 | 11/2013 | Moore et al. | |
| 2013/0346867 A1 | 12/2013 | Woods et al. | |
| 2014/0037264 A1 * | 2/2014 | Jackson ........... | H04N 21/44222 386/E5.052 |
| 2014/0168354 A1 | 6/2014 | Clavel et al. | |
| 2014/0177964 A1 * | 6/2014 | Godlewski ......... | H04N 21/2343 382/190 |
| 2014/0259041 A1 | 9/2014 | Sharifi | |
| 2014/0282632 A1 | 9/2014 | Hardy et al. | |
| 2014/0365494 A1 | 12/2014 | Gangavaram et al. | |

(56) References Cited

U.S. PATENT DOCUMENTS

| | | | | |
|---|---|---|---|---|
| 2015/0070516 A1* | 3/2015 | Shoemake | ......... | H04N 21/4542 |
| | | | | 348/207.11 |
| 2015/0113547 A1 | 4/2015 | Wolf et al. | | |
| 2015/0128197 A1* | 5/2015 | Lo | .................... | H04N 21/23116 |
| | | | | 725/100 |
| 2015/0134334 A1 | 5/2015 | Sachidanandam et al. | | |
| 2015/0194155 A1 | 7/2015 | Tsujikawa et al. | | |
| 2015/0199962 A1 | 7/2015 | Han et al. | | |
| 2016/0037217 A1* | 2/2016 | Harmon | ............. | H04N 21/4542 |
| | | | | 725/9 |
| 2016/0063009 A1* | 3/2016 | Charania | ............... | G06F 16/125 |
| | | | | 707/693 |
| 2016/0080835 A1 | 3/2016 | Von Sneidern et al. | | |
| 2016/0234553 A1* | 8/2016 | Hampson | ........... | H04N 21/4667 |
| 2016/0309217 A1 | 10/2016 | Maltar et al. | | |
| 2018/0060321 A1 | 3/2018 | Sanio et al. | | |
| 2019/0155832 A1 | 5/2019 | Kuznetsov | | |
| 2021/0289253 A1 | 9/2021 | Maltar et al. | | |

FOREIGN PATENT DOCUMENTS

| | | |
|---|---|---|
| KR | 20080000203 A | 1/2008 |
| WO | 9222983 A2 | 12/1992 |
| WO | 2009026564 A1 | 2/2009 |
| WO | 2012087735 A1 | 6/2012 |
| WO | 2014199602 A1 | 12/2014 |

OTHER PUBLICATIONS

"Cut part from video file from start position to end position with FFmpeg—Super User", Anonymous: "Cut part from video file from start position to end position with FFmpeg—Super User", Mar. 16, 2015 (Mar. 16, 2015), pp. 1-3, XP055782254, Retrieved from the Internet: URL:https://web.archive.org/web/20150316184344/.

"EP Search Report", Extended EP Search Report of EP Application No. 18198993.0 dated Dec. 11, 2018.

"EP Search Report", Extended EP Search Report of EP Application No. 18198994.8 dated Dec. 11, 2018.

"EP Search Report", Extended EP Search Report of EP Application No. 18198996.3 dated Dec. 11, 2018.

"ISR and Writte Opinion", International Search Report and Written Opinion dated Jun. 23, 2016 for International Application No. PCT/US2016/024485, Filed Mar. 28, 2016.

"Litigation Doc", (Feb. 18, 2020) (5 pages).

"Litigation Doc", *Comcast Cable Communications, LLC* vs. *Rovi Guides, Inc.* in the U.S. Patent Trial and Appeals Board under Case No. IPR2019-00555, American Heritage Dictionary, Fifth Edition (4 pages) Ex 2013.

"Litigation Doc", *Comcast Cable Communications, LLC* vs. *Rovi Guides, Inc.* in the U.S. Patent Trial and Appeals Board under Case No. IPR2019-00555, B. Stroustrup, The C++ Programming Language (39 pages) Ex 2008.

"Litigation Doc", *Comcast Cable Communications, LLC* vs. *Rovi Guides, Inc.* in the U.S. Patent Trial and Appeals Board under Case No. IPR2019-00555, Brian Burrell, Guide to Everyday Math, A Home and Business Reference (63 pages) Ex 2010.

"Litigation Doc", *Comcast Cable Communications, LLC* vs. *Rovi Guides, Inc.* in the U.S. Patent Trial and Appeals Board under Case No. IPR2019-00555, Cambridge Dictionary of American English, Cambridge University Press (3 pages) Ex 2012.

"Litigation Doc", *Comcast Cable Communications, LLC* vs. *Rovi Guides, Inc.* in the U.S. Patent Trial and Appeals Board under Case No. IPR2019-00555, David Flanagan, JavaScript, The Definitive Guide, O'Reilly (2 parts total 180 pages) Ex 2009.

"Litigation Doc", *Comcast Cable Communications, LLC* vs. *Rovi Guides, Inc.* in the U.S. Patent Trial and Appeals Board under Case No. IPR2019-00555, Decision Denying Petition.

"Litigation Doc", *Comcast Cable Communications, LLC* vs. *Rovi Guides, Inc.* in the U.S. Patent Trial and Appeals Board under Case No. IPR2019-00555, Decision to Institute (Jul. 24, 2019) (51 pages).

"Litigation Doc", *Comcast Cable Communications, LLC* vs. *Rovi Guides, Inc.* in the U.S. Patent Trial and Appeals Board under Case No. IPR2019-00555, Declaration Edward A. Fox Ph.D. in Support of Petitioner's Reply to Patent Owner's Response (Feb. 12, 2020) (36 pages) Ex 1134.

"Litigation Doc", *Comcast Cable Communications, LLC* vs. *Rovi Guides, Inc.* in the U.S. Patent Trial and Appeals Board under Case No. IPR2019-00555, Declaration of Carrie Gardner (Sep. 1, 2019) (54 pages) Ex 1321.

"Litigation Doc", *Comcast Cable Communications, LLC* vs. *Rovi Guides, Inc.* in the U.S. Patent Trial and Appeals Board under Case No. IPR2019-00555, Declaration of Daniel R. McNeely (Jan. 10, 2019) (3 pages) Ex 1130.

"Litigation Doc", *Comcast Cable Communications, LLC* vs. *Rovi Guides, Inc.* in the U.S. Patent Trial and Appeals Board under Case No. IPR2019-00555, Declaration of John Tinsiman in Support of Patent Owner's Response (Oct. 20, 2019) (103 pages) Ex 2005.

"Litigation Doc", *Comcast Cable Communications, LLC* vs. *Rovi Guides, Inc.* in the U.S. Patent Trial and Appeals Board under Case No. IPR2019-00555, Declaration of John Tinsman in Support of Patent Owner's Preliminary Response (May 12, 2019) (73 pages).

"Litigation Doc", *Comcast Cable Communications, LLC* vs. *Rovi Guides, Inc.* in the U.S. Patent Trial and Appeals Board under Case No. IPR2019-00555, Declaration of Wade Warren (Alberca) (Sep. 27, 2018) (15 pages) Ex 1105.

"Litigation Doc", *Comcast Cable Communications, LLC* vs. *Rovi Guides, Inc.* in the U.S. Patent Trial and Appeals Board under Case No. IPR2019-00555, Dedicated to the memory of Jess Stein, Random House Inc., (4 pages) Ex 1124.

"Litigation Doc", *Comcast Cable Communications, LLC* vs. *Rovi Guides, Inc.* in the U.S. Patent Trial and Appeals Board under Case No. IPR2019-00555, Definition of Option (Jun. 30, 201) (1 page) Ex 3001.

"Litigation Doc", *Comcast Cable Communications, LLC* vs. *Rovi Guides, Inc.* in the U.S. Patent Trial and Appeals Board under Case No. IPR2019-00555, Deposition Transcript of Edward Alan Fox (Oct. 14, 2019) (281 pages) Ex 2011Fox.

"Litigation Doc", *Comcast Cable Communications, LLC* vs. *Rovi Guides, Inc.* in the U.S. Patent Trial and Appeals Board under Case No. IPR2019-00555, Euzenat et al., ACM Computing Classification, Ontology Matching (1998) (52 pages) Ex 1106.

"Litigation Doc", *Comcast Cable Communications, LLC* vs. *Rovi Guides, Inc.* in the U.S. Patent Trial and Appeals Board under Case No. IPR2019-00555, First Amended Complaint and Exhibit L (Feb. 8, 2018) (113 pages) Ex 1135.

"Litigation Doc", *Comcast Cable Communications, LLC* vs. *Rovi Guides, Inc.* in the U.S. Patent Trial and Appeals Board under Case No. IPR2019-00555, IEEE Definition of Prompt (4 pages) Ex 2004.

"Litigation Doc", *Comcast Cable Communications, LLC* vs. *Rovi Guides, Inc.* in the U.S. Patent Trial and Appeals Board under Case No. IPR2019-00555, Judgment—Final Written Decision (Jul. 21, 2020) (91 pages).

"Litigation Doc", *Comcast Cable Communications, LLC* vs. *Rovi Guides, Inc.* in the U.S. Patent Trial and Appeals Board under Case No. IPR2019-00555, Kernighan et al., Programming Language (35 pages) Ex 2007.

"Litigation Doc", *Comcast Cable Communications, LLC* vs. *Rovi Guides, Inc.* in the U.S. Patent Trial and Appeals Board under Case No. IPR2019-00555, Merriam Webster, Definition of Symbol (4 pages) Ex 1133.

"Litigation Doc", *Comcast Cable Communications, LLC* vs. *Rovi Guides, Inc.* in the U.S. Patent Trial and Appeals Board under Case No. IPR2019-00555, Merriam Webster, Definition of Symbol (5 pages) Ex 1136.

"Litigation Doc", *Comcast Cable Communications, LLC* vs. *Rovi Guides, Inc.* in the U.S. Patent Trial and Appeals Board under Case No. IPR2019-00555, Merriam-Webster (4 pages).

"Litigation Doc", *Comcast Cable Communications, LLC* vs. *Rovi Guides, Inc.* in the U.S. Patent Trial and Appeals Board under Case No. IPR2019-00555, Merriam-Webster Definition of Unit (6 pages) Ex. 2003.

"Litigation Doc", *Comcast Cable Communications, LLC* vs. *Rovi Guides, Inc.* in the U.S. Patent Trial and Appeals Board under Case

(56) References Cited

OTHER PUBLICATIONS

No. IPR2019-00555, Nielsen, Confirmation Dialogs Can Prevent User Errors—If Not Overused (Feb. 18, 2018) (9 pages) Ex 2014.
"Litigation Doc", *Comcast Cable Communications, LLC* vs. *Rovi Guides, Inc.* in the U.S. Patent Trial and Appeals Board under Case No. IPR2019-00555, Oxford English Dictionary (4 pages) Ex 2006.
"Litigation Doc", *Comcast Cable Communications, LLC* vs. *Rovi Guides, Inc.* in the U.S. Patent Trial and Appeals Board under Case No. IPR2019-00555, Patent Owner's Preliminary Response (May 13, 2019) (65 pages).
"Litigation Doc", *Comcast Cable Communications, LLC* vs. *Rovi Guides, Inc.* in the U.S. Patent Trial and Appeals Board under Case No. IPR2019-00555, Patent Owner's Sur-Reply to petitioner's Reply to Patent Owners Response (Mar. 13, 2020) (31 pages).
"Litigation Doc", *Comcast Cable Communications, LLC* vs. *Rovi Guides, Inc.* in the U.S. Patent Trial and Appeals Board under Case No. IPR2019-00555, Patent Owners Demonstratives (Jan. 5, 2020) (61 pages) Ex 2020.
"Litigation Doc", *Comcast Cable Communications, LLC* vs. *Rovi Guides, Inc.* in the U.S. Patent Trial and Appeals Board under Case No. IPR2019-00555, Petition (Jan. 10, 2019) (94 pages).
"Litigation Doc", *Comcast Cable Communications, LLC* vs. *Rovi Guides, Inc.* in the U.S. Patent Trial and Appeals Board under Case No. IPR2019-00555, Petitioner's Reply to Patent Owner's Response (Feb. 12, 2020) (31 pages).
"Litigation Doc", *Comcast Cable Communications, LLC* vs. *Rovi Guides, Inc.* in the U.S. Patent Trial and Appeals Board under Case No. IPR2019-00555, Petitioners' Demonstrative Exhibits for Oral Argument (68 pages) Ex 1138.
"Litigation Doc", *Comcast Cable Communications, LLC* vs. *Rovi Guides, Inc.* in the U.S. Patent Trial and Appeals Board under Case No. IPR2019-00555, Ricardo Baeza-Yates, Modern Information Retrieval (1999) (226 pages) Ex 1114.
"Litigation Doc", *Comcast Cable Communications, LLC* vs. *Rovi Guides, Inc.* in the U.S. Patent Trial and Appeals Board under Case No. IPR2019-00555, Rijsbergen, Automatic Classification, Information Retrieval, Second Edition (1979) (7 pages) Ex 1113.
"Litigation Doc", *Comcast Cable Communications, LLC* vs. *Rovi Guides, Inc.* in the U.S. Patent Trial and Appeals Board under Case No. IPR2019-00555, Setrag Koshafian et al., MultiMedia and Imaging Databases (1996) (42 pages) Ex 1119.
"Litigation Doc", *Comcast Cable Communications, LLC* vs. *Rovi Guides, Inc.* in the U.S. Patent Trial and Appeals Board under Case No. IPR2019-00555, Speech Recognition Through the Decades How We Ended Up With Siri PC World, (Oct. 10, 2018) (5 pages) Ex 1118.
"Litigation Doc", *Comcast Cable Communications, LLC* vs. *Rovi Guides, Inc.* in the U.S. Patent Trial and Appeals Board under Case No. IPR2019-00555, Steinmetz et al., Multimedia Computing, Communications, and Applications (1995) (2 parts total 150 pages).
"Litigation Doc", *Comcast Cable Communications, LLC* vs. *Rovi Guides, Inc.* in the U.S. Patent Trial and Appeals Board under Case No. IPR2019-00555, Transcript of Deposition of Jon Tinsman (Jan. 28, 2020) (247 pages) Ex 1132.
"Litigation Doc", *Comcast Cable Communications, LLC* vs. *Rovi Guides, Inc.* in the U.S. Patent Trial and Appeals Board under Case No. IPR2019-00555, Wallance Wang, Beginning Programming for Dummies (2003) (56 pages) Ex 1116.
"Litigation Doc", *Comcast Cable Communications, LLC* vs. *Rovi Guides, Inc.* in the U.S. Patent Trial and Appeals Board under Case No. IPR2019-00556, Patent Owners Preliminary Response (May 13, 2019) (54 pages).
"Litigation Doc", *Comcast Cable Communications, LLC* vs. *Rovi Guides, Inc.* in the U.S. Patent Trial and Appeals Board under Case No. IPR2019-00556, Petition (Jan. 10, 2019) (94 pages).
"Litigation Doc", *Comcast Cable Communications, LLC* vs. *Rovi Guides, Inc.* in the U.S. Patent Trial and Appeals Board under Case No. IPR2019-00557, Patent Owners Preliminary Response (May 20, 2019) (54 pages).
"Litigation Doc", *Comcast Cable Communications, LLC* vs. *Rovi Guides, Inc.* in the U.S. Patent Trial and Appeals Board under Case No. IPR2019-00557, Petition (Jan. 10, 2019) (102 pages).
"Litigation Doc", *Comcast Cable Communications, LLC* vs. *Rovi Guides, Inc.* in the U.S. Patent Trial and Appeals Board under Case No. IPR2019-00558, Patent Owners Preliminary Response (May 20, 2019) (50 pages).
"Litigation Doc", *Comcast Cable Communications, LLC* vs. *Rovi Guides, Inc.* in the U.S. Patent Trial and Appeals Board under Case No. IPR2019-00558, Petition (Jan. 10, 2019) (96 pages).
"Litigation Doc", Ex 1115.
"Litigation Doc", Ex 1117.
"Litigation Doc", Ex 2001.
"Litigation Doc", *Rovi Guides, Inc.,* v. *Comcast Corporation et al.* in the U.S. District Court for the Central District of California under Case No. 2:18-cv-00253; Complaint for Patent Infringement, dated Jan. 10, 2018, 584 pages.
"Litigation Doc", United States International Trade Commission, Washington, D.C., Investigation No. 337-TA-1103, Comcast Respondents' Corrected Claim Construction Brief (Jun. 27, 2018) (152 pages) Ex 1125.
"Litigation Doc", United States International Trade Commission, Washington, D.C., Investigation No. 337-TA-1103, Declaration of Vijay K. Madisetti, Ph.D. (Jun. 15, 2018) (41 pages) Ex 1127.
"Litigation Doc", United States International Trade Commission, Washington, D.C., Investigation No. 337-TA-1103, Itc Markman Hearing Transcript (Jul. 26, 2018) (214 pages) Ex 1128.
"Litigation Doc", United States International Trade Commission, Washington, D.C., Investigation No. 337-TA-1103, Madisetti Rebuttal Expert Report on Invalidity (Jul. 25, 2018) (43 pages) Ex 1129.
"Litigation Doc", United States International Trade Commission, Washington, D.C., Investigation No. 337-TA-1103, Rovis Complainants' Opening Claim Construction Brief (Jun. 15, 2018) (190 pages) Ex 1126.
"Litigation Doc", *Comcast Cable Communications, LLC* vs. *Rovi Guides, Inc.* in the U.S. Patent Trial and Appeals Board under Case No. IPR2019-00555,.
"Litigation Doc", *Comcast Cable Communications, LLC* vs. *Rovi Guides, Inc.* in the U.S. Patent Trial and Appeals Board under Case No. IPR2019-00555, Jurafsky et al.
"Pafy Documentation", Anonymous, Pafy Documentation—pafy 0.3.70 documentation, PythonHosted.com, Feb. 17, 2015 (Feb. 17, 2015), pp. 1-3, XP055278978, pythonhosted.com, Retrieved from the Internet.
"Python—Extract chunks from video file-", Anonymous, python—Extract chunks from video file—Stack Overflow, Jan. 11, 2012 (Jan. 11, 2012), XP055278983, StackOverflow.com, Retrieved from the Internet.
"pythonhosted.orglpafy" , URL:http://web.archive.org/web/20150217061448/http://pythonhosted.orglpafy [retrieved on Jun. 8, 2016].
Anonymous, "Cut part from video file from start position to end position with FFmpeg—Super User," Mar. 16, 2015 (6 pages) (https://superuser.com/questions/377343/cut-part-from-video-file-from-start-position-to-end-position-with-ffmpeg).

* cited by examiner

SYSTEMS AND METHODS FOR IDENTIFYING AND STORING A PORTION OF A MEDIA ASSET

CROSS-REFERENCE TO RELATED APPLICATIONS

This application is a continuation of U.S. patent application Ser. No. 17/197,728, filed Mar. 10, 2021, which is a continuation of U.S. patent application Ser. No. 16/518,584, filed Jul. 22, 2019, now U.S. Pat. No. 10,979,762, which is a continuation of U.S. patent application Ser. No. 15/604,403, filed May 24, 2017, now U.S. Pat. No. 10,425,680, which is a continuation of U.S. patent application Ser. No. 15/195,530, filed Jun. 28, 2016, now U.S. Pat. No. 9,668,014, which is a continuation of U.S. patent application Ser. No. 14/673,493, filed Mar. 30, 2015, now U.S. Pat. No. 9,392,324, the contents of which are hereby incorporated by reference herein in their entireties.

BACKGROUND

In recent years, the number of ways in which users have been able to access, interact with, and record a plethora of media assets has expanded rapidly. Typically, the entirety of a show, movie, or other media asset is recorded at once. However, it is often the case that a user is only interested in a specific portion of a given media asset.

SUMMARY

Accordingly, methods and systems are disclosed herein for a media guidance application that identifies and stores portions of media assets based on user commands. In particular, the media guidance application may receive a command, such as a voice command, from a user and then act on the command. For example, the media guidance application may determine that the voice command includes an instruction to store a portion of a media asset (e.g., a scene). The media guidance application may then find a source (e.g., a video-on-demand provider) for the portion of the media asset and cause the portion of the media asset to be stored. By doing so, the media guidance application may facilitate the storage of the requested portion of the media asset without consuming unnecessary bandwidth or storage space. The media guidance application may also facilitate the later viewing of the portion of the media asset without requiring the user to search within the entirety of the media asset for the originally requested portion.

In some aspects, a media guidance application may receive a command from a user (e.g., a voice command). For example, the media guidance application may be implemented on a user device comprising a microphone through which a voice command may be received. The media guidance application may then determine (e.g., via control circuitry) that the command comprises an instruction to store a portion of a media asset, wherein the portion is less than the entire media asset. For example, the command may comprise an instruction to store at least one of a specific scene, clip, chapter, interview, trailer, advertisement, and outtake from or related to the media asset.

The media guidance application may then identify (e.g., via control circuitry) a source of the portion of the media asset. For example, the media guidance application may search schedule data (e.g., located at storage circuitry) for an upcoming broadcast of the media asset. The source may be any suitable provider of which the media guidance application is aware. For example, the media guidance application may access (e.g., via a communications network) a database of known media asset sources.

The media guidance application may then cause the portion of the media asset to be stored (e.g., at storage circuitry). For example, the media guidance application may retrieve (e.g., via a communications network) the portion of the media asset from a remote database and then store the portion of the media asset at a user equipment of a user (e.g., to storage circuitry). In another example, the media guidance application may record (e.g., to storage circuitry) the portion of the media asset from a broadcast of the media asset.

In some embodiments, the media guidance application may determine that the command comprises an indication of a duration of the portion of the media asset. For example, the media guidance application may determine that the command includes an instruction to store the first five minutes of a media asset. The media guidance application may then determine (e.g., via control circuitry) a starting position and an ending position of the portion of the media asset based on the indication. For example, the media guidance application may determine that "the first five minutes" corresponds to a starting position of zero minutes (i.e., the beginning of the media asset) and an ending position of five minutes. The media guidance application may then cause the portion of the media asset that elapses between the starting position and the ending position to be stored. For example, in this case, only the first five minutes of the media asset would be stored.

In another example, the media guidance application may identify the portion of the media asset that the user is currently watching and, in the absence of an explicit duration indication, cause that portion to be stored. The media guidance application may identify the portion of the media asset in part by determining the identity of the media asset based on the location of the user, the time of the request, and the channel, provider, or other source the user was viewing at the time the command was issued. This process is discussed in greater detail below.

In some embodiments, the media guidance application may detect a signal associated with the media asset. For example, the media guidance application may detect an audio signal containing audio from the media asset (e.g., via the same microphone used to receive a voice command). The media guidance application may then determine (e.g., via control circuitry) a fingerprint associated with the media asset based on the signal. For example, the media guidance application may determine an acoustic fingerprint for the detected audio signal. The media guidance application may then access a database comprising a plurality of known fingerprints. For example, the database (e.g., located at a remote server and accessed via a communications network) may comprise a list of previously determined fingerprints for a plurality of media assets. The media guidance application may then cross-reference the fingerprint with the plurality of known fingerprints and determine the identity of the source of the portion of the media asset based on the cross-referencing. For example, the media guidance application may compare the fingerprint to the list of previously determined fingerprints to find a match.

In some embodiments, the media guidance application may detect a device identifier in the instruction. For example, the media guidance application may detect a user instruction to store the portion of the media asset by detecting the user's statement of the phrase "my tablet." The media guidance application may then determine (e.g., via control circuitry) which device the identifier corresponds to based on a user profile. For example, the media guidance application may recognize that the term "my tablet" refers to a specific device associated with the user based on a user profile (e.g., located at storage circuitry). The media guidance application may then cause the portion of the media asset to be stored at the device. For example, the media guidance application may cause the portion of the media asset to be stored on the user's tablet based on this operation, as opposed to another device associated with the user.

The media guidance application may also, once the source of the portion of the media asset has been identified and the device has been determined, generate for display (e.g., via control circuitry) a storage confirmation message. For example, the media guidance application may generate for display, on the user device at which the command was received, a message confirming that the portion of the media asset has been found and a recording will soon be on the identified device. The media guidance application may, in the message, identify the media asset, user, identified device, or any other relevant storage-related information or any combination thereof.

In some embodiments, the media guidance application may determine that the portion of the media asset has been partially played at an initial source corresponding to the instruction. For example, if the media guidance application determines that the user has requested that a scene from a broadcast currently in progress be stored, the media guidance application may determine (e.g., via control circuitry) that the scene has already been partially played (i.e., that only a fragment of the portion of the media asset could be stored from the initial source). In response to this determination, the media guidance application may then identify a secondary source for the portion of the media asset. For example, the media guidance application may search schedule data (e.g., located at storage circuitry) and identify a future broadcast of the media asset as the secondary source for the portion of the media asset such that the whole of the requested portion may be stored.

In some embodiments, the media guidance application may determine that the command comprises a received media asset identifier. For example, the media guidance application may detect that the user, in his or her command, requested a media asset by name. The media guidance application may then access (e.g., via control circuitry) a database comprising a plurality of known media asset identifiers. For example, the media guidance application may access a database stored on a remote server containing a list of known media asset identifiers (for example, names of available media assets).

After accessing the database, the media guidance application may cross-reference the received media asset identifier against the plurality of known media asset identifiers. Based on this cross-referencing, the media guidance application may then determine that the received media asset identifier does not match any known media asset identifier of the plurality or known media asset identifiers. For example, if the media guidance application determines that the user has requested a media asset using an erroneous or shortened version of its proper name, the media guidance application may determine (e.g., using control circuitry), that the name the user specified does not match any known name in the database.

The media guidance application may then calculate a set of similarity metrics for the plurality of known media asset identifiers. A similarity metric, as computed by the media guidance application, may be numerical and correspond to a degree of similarity between the received media asset identifier and the known media asset identifier. For example, the media guidance application may compute the similarity metric such that it corresponds to how close the name received from the user is to a given media asset named in the database. The media guidance application may determine this closeness using a character-wise comparison, word-by-word comparison, categorical comparison (i.e., determining if the received media asset identifier and the known media asset identifier belong to the same category, such as a genre), or any other appropriate method of comparison. The process of calculating a similarity metric is discussed in greater detail below in connection with FIG. 12.

The media guidance application may then determine (e.g., using control circuitry) that a similarity metric of the set of similarity metrics exceeds a threshold similarity metric. For example, if the media guidance application determines that a similarity metric exceeds the threshold, this may signal to the media guidance application that at least one of the known media asset identifiers is a potential match. Based on this determination, the media guidance application may then select a suggested media asset identifier and provide to the user an option to confirm that that suggested media asset identifier corresponds to the received media asset identifier. For example, if the media guidance application determines that the user requested "Star Wars 1," the media guidance application may suggest "Star Wars Episode 1: The Phantom Menace" as a potential match.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
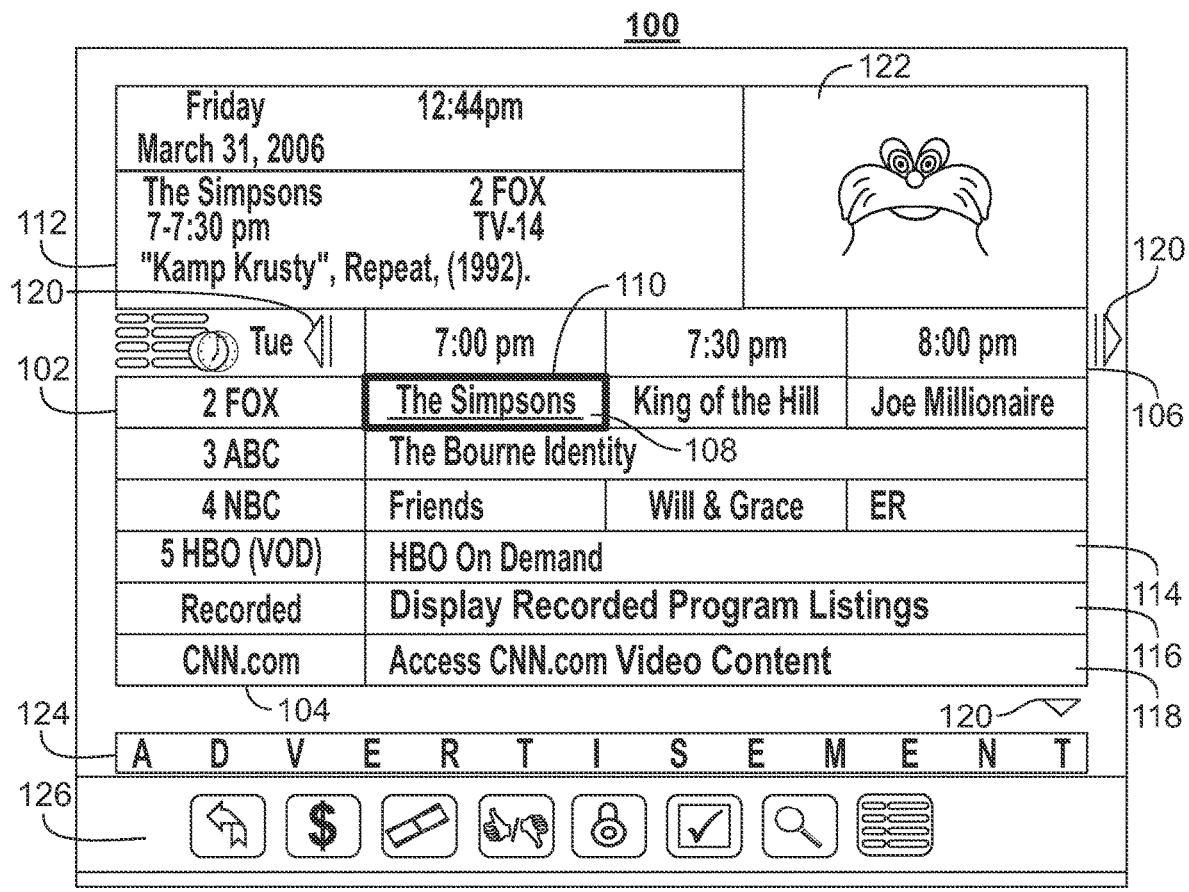
FIG. 1 shows an illustrative example of a display screen generated by a media guidance application in accordance with some embodiments of the disclosure.

Methods and systems are disclosed herein for a media guidance application that identifies and stores portions of media assets based on user commands. In particular, the media guidance application may receive a command from a user and then act on the command. For example, the media guidance application may determine that the command includes an instruction to store a portion of a media asset (e.g., a clip). The media guidance application may then find a source (e.g., a future broadcast) for the portion of the media asset and cause the portion of the media asset to be stored. By doing so, the media guidance application may facilitate the later viewing of the portion of the media asset without requiring the user to search within the entirety of the media asset for the originally requested portion. For example, the media guidance application may cause only the portion of the media asset to be stored, allowing the user to access it at a later time. In another example, the media guidance application may store the entire media asset, and may associate a pointer with the portion of the media asset, such that when the user accesses the stored media asset, the media guidance application causes playback to begin at the start of the requested portion by relying on the pointer as an indicator of the start of the requested portion.

In some aspects, a media guidance application may receive a command from a user (e.g., a voice command). For example, the media guidance application may be implemented on a user device comprising a microphone through which a voice command may be received. The media guidance application may then determine (e.g., via control circuitry) that the command comprises an instruction to store a portion of a media asset, wherein the portion is less than the entire media asset. For example, the command may comprise an instruction to store at least one of a specific scene, clip, chapter, interview, trailer, advertisement, and outtake from or related to the media asset. The command may also comprise an instruction to store a plurality of portions of the media asset that are related to one another. For example, the portions may contain a certain actor or character, be associated with a threshold number of mentions or interactions on social media, contain a certain type of music, be associated with a certain mood, be scheduled for recording by friends of the user, or any other appropriate criteria or any combination thereof.

The media guidance application may then identify (e.g., via control circuitry) a source of the portion of the media asset. For example, the media guidance application may search schedule data (e.g., located at storage circuitry) for an upcoming broadcast of the media asset. The source may be any suitable provider of which the media guidance application is aware. For example, the media guidance application may access (e.g., via a communications network) a database of known media asset sources.

The media guidance application may then cause the portion of the media asset to be stored (e.g., at storage circuitry). For example, the media guidance application may retrieve (e.g., via a communications network) the portion of the media asset from a remote database and then store the portion of the media asset at a user equipment of a user (e.g., to storage circuitry). In another example, the media guidance application may record (e.g., to storage circuitry) the portion of the media asset from a broadcast of the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
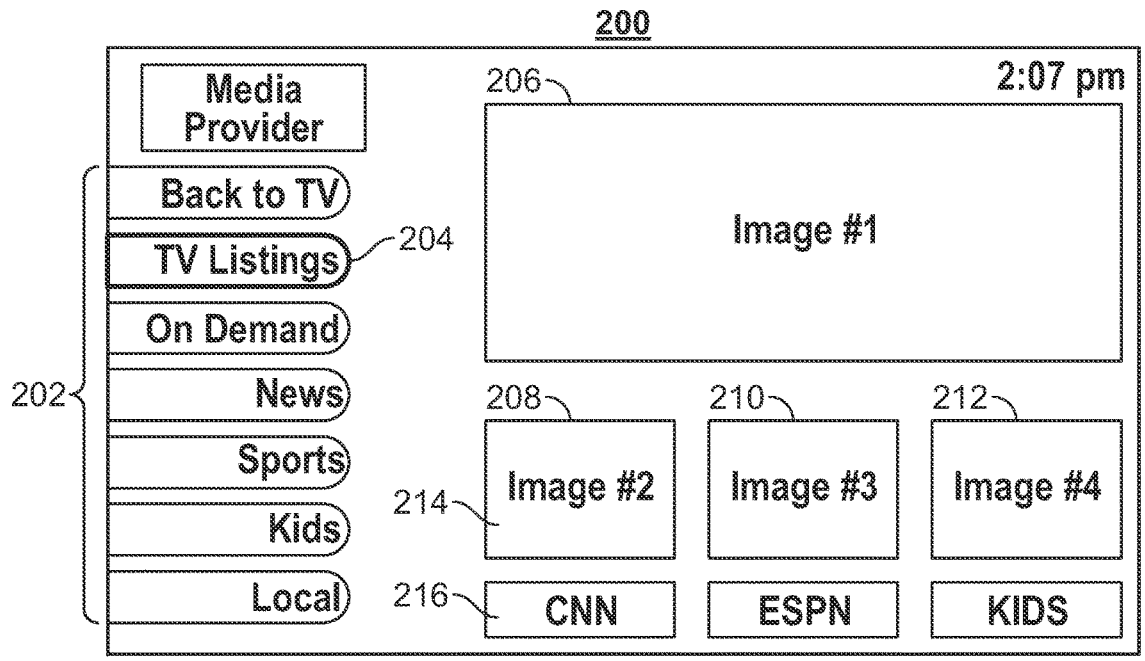
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
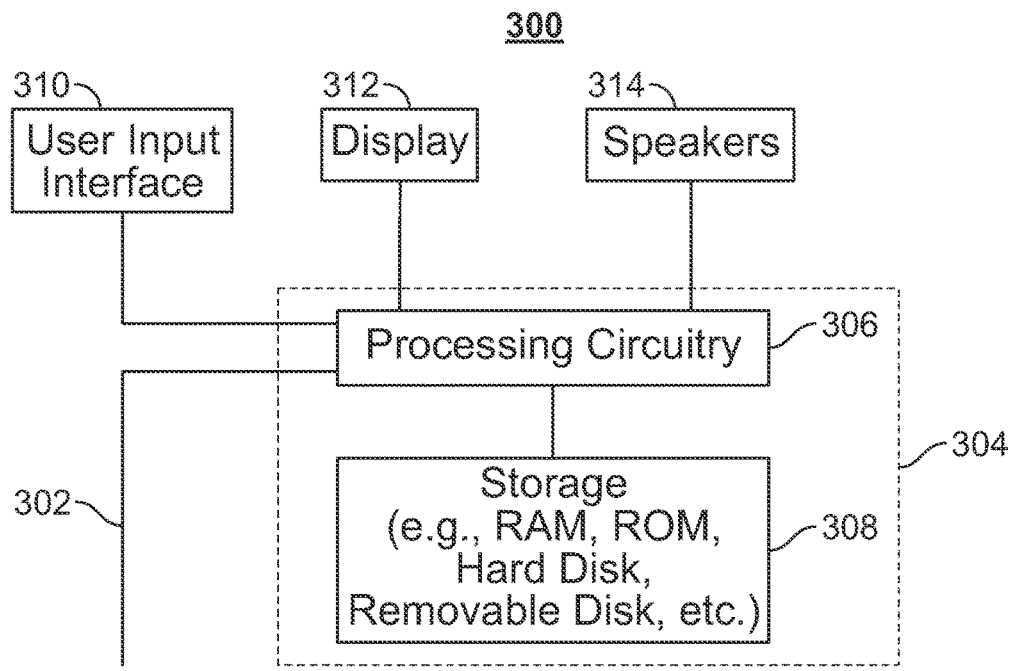
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
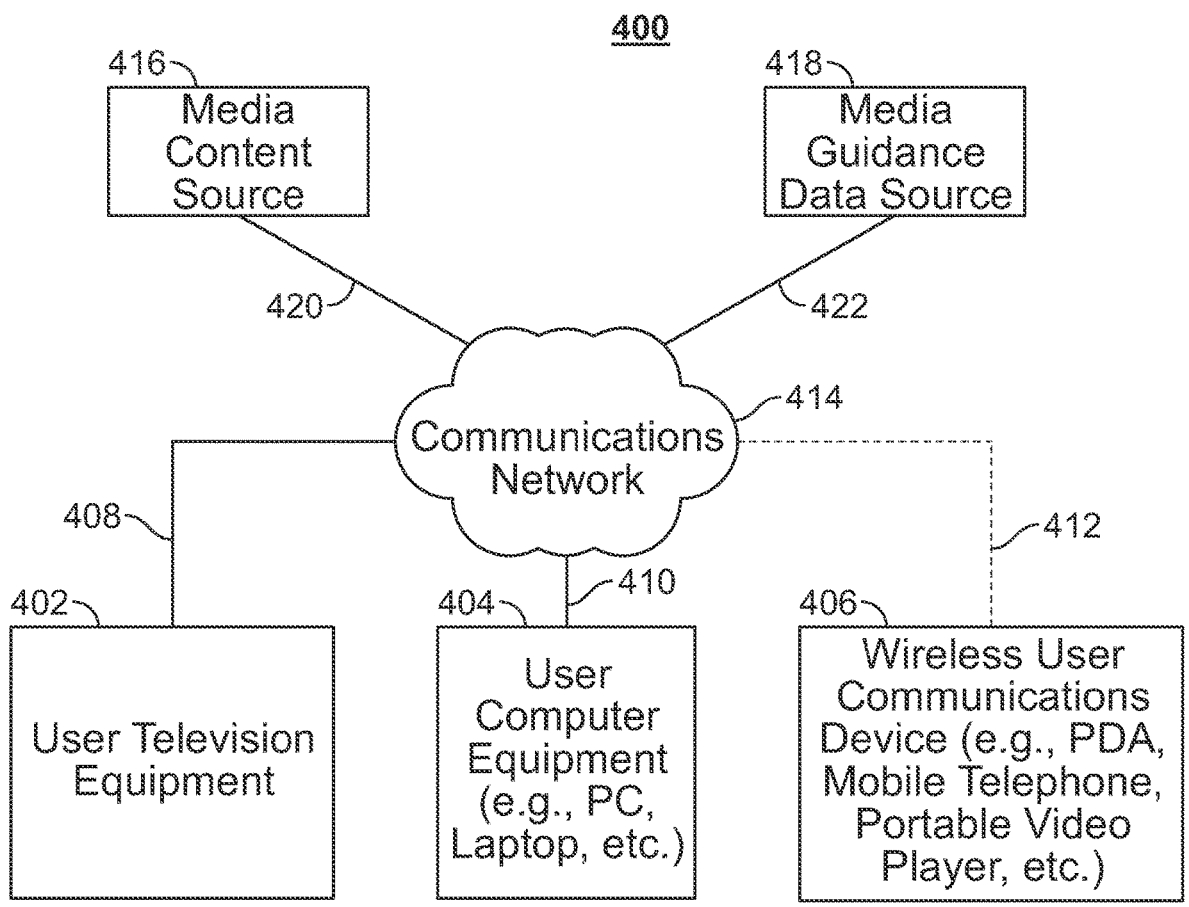
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, a "command" is defined to be any input directed from a user to the media guidance application on which the media guidance application is meant to act. For example, the command may comprise an instruction for the media guidance application to search for, store, or play back a given media asset. A command may be relative to a piece of content (e.g., "Find the next broadcast of this show.") or absolute (e.g., "Go to channel 2."). Commands may also be implied. For example, if the media guidance application detects that the user said "I love this show," it may schedule a recording of the next broadcast of the program. The media guidance application may interpret these implied commands based on context, user command history, similar commands from other users, and/or user preferences.

As referred to herein, a "portion of a media asset" is data from or related to the media asset that is itself less than the entire media asset. For example, the opening scene from a media asset is a portion of that media asset. In another example, a trailer related to the media asset is also a portion of the media asset.

As referred to herein, an "indication of a duration" is a user input that specifies, either explicitly or implicitly, the boundaries of the portion of the media asset. As with a command, the indication may be relative (e.g., "the next five minutes" or "this scene") or absolute (e.g., "from the 30-minute mark to the 45-minute mark").

As referred to herein, a "starting position" and an "ending position" are the start and end points of a portion of a media asset within the entirety of the media asset, respectively. For example, as shown previously, the starting position and ending position may be time markers (e.g., zero minutes and five minutes into the media asset). The starting position and ending position may also be scene transitions, commercial breaks, or any other suitable points of demarcation or any combination thereof.

As referred to herein, a "device identifier" is any identifier that may be relied upon to identify a specific device. For example, the media guidance application may detect that the user has instructed the media guidance application to store the portion of the media asset on "my phone," which may enable the media guidance application to identify a particular phone that belongs to the user for the purposes of performing the storage operation. A device identifier may also refer to a device by its product name or a custom name set by the user. A device identifier may also refer to devices belonging to other users of which the media guidance application is aware (e.g., "my sister's tablet").

As referred to herein, a "confirmation message" is an indication from the media guidance application to the user that the command received from the user has been processed and acted upon. The confirmation message may be visual, auditory, tactile (e.g., a vibration), any other suitable method of communication, or any combination thereof.

As referred to herein, a "media asset identifier" is any term or phrase that can be used to identify a media asset. The media asset identifier may be a title, nickname, abbreviation, or description of a media asset, any other suitably distinct term, or any combination thereof.

In some embodiments, a media guidance application may receive a command from a user (e.g., via control circuitry 304) and determine that it comprises an instruction to store a portion (e.g., the first five minutes) of the media asset the user is currently viewing. The media guidance application may then identify (e.g., via control circuitry 304) a source of the first five minutes of the media asset and cause that portion of the media asset to be stored (e.g., on the user's tablet). Thus, the media guidance application (via control circuitry 304) enables a user to record a portion of a media asset without manually configuring the recording parameters or having to record the entirety of the media asset and extract the desired portion.

Figure 5:
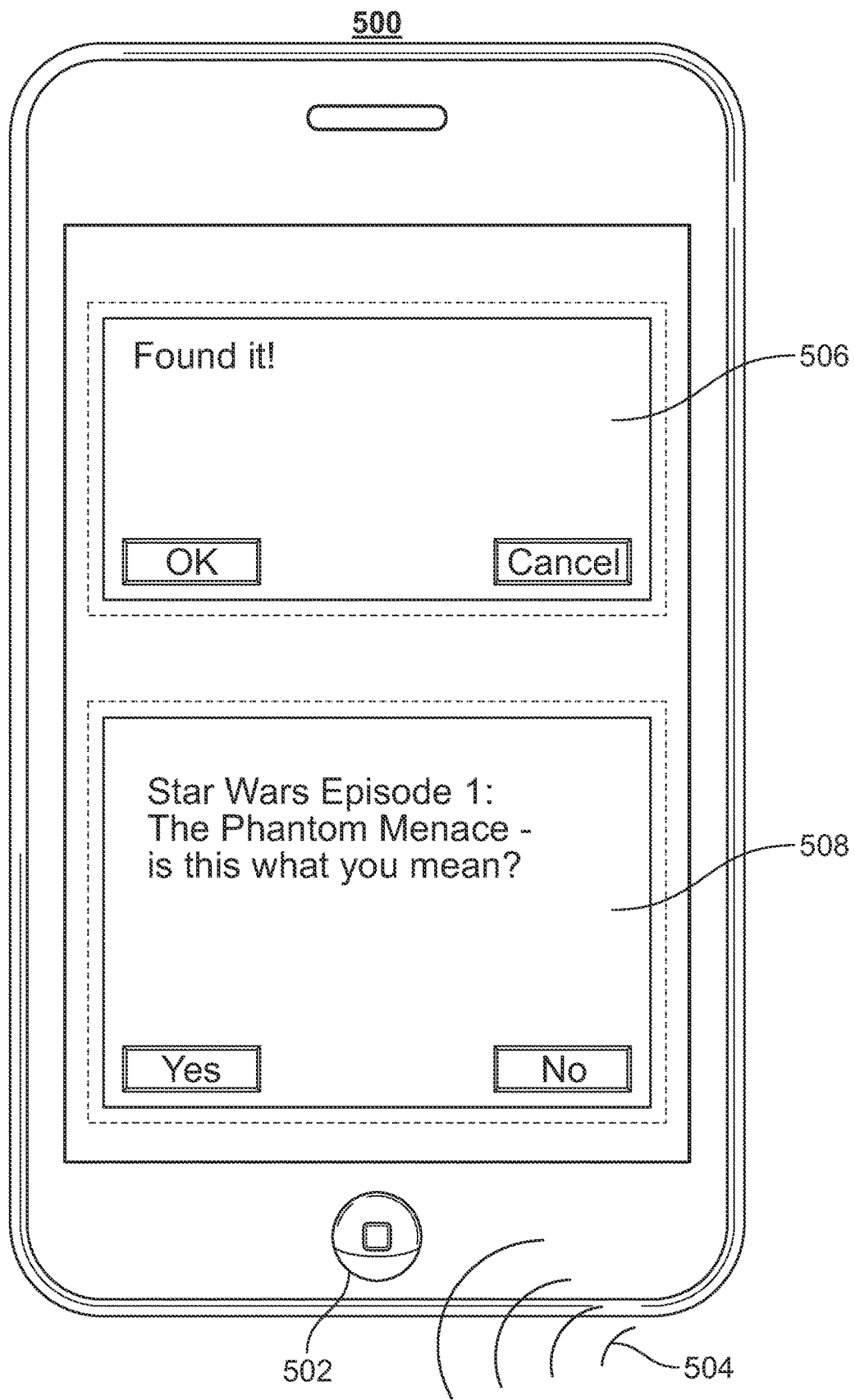
FIG. 5 shows an illustrative embodiment of a user device on which the media guidance application has been implemented in accordance with some embodiments of the disclosure.

FIG. 5 shows an illustrative embodiment of a user device on which the media guidance application has been implemented in accordance with some embodiments of the disclosure. The user device is user equipment device 500, which may be any of user equipment devices 402, 404, or 406.

FIG. 5 shows user equipment device 500 receiving, via microphone 502, command 504. User equipment device 500 may be any user equipment, such as user equipment device 402, 404, or 406. Microphone 502 can be any user input interface 310, and is presented in FIG. 5 as a microphone for illustrative purposes. The media guidance application may receive command 504 via user input interface 310 using audio recognition, video recognition (e.g., for a gestural command), touch recognition (e.g., for input on a touchscreen), text, or any other suitable means of communication. Command 504 may be received by microphone 502 either locally (as received through an auditory sensor such as a microphone, as depicted in in FIG. 5). For example, the media guidance application, implemented on user equipment device 500, may detect that command 504, received with microphone 502, comprises an instruction to store a portion of "Star Wars Episode 1: The Phantom Menace." Alternatively, command 504 may be received by the media guidance application via control circuitry 304 of user equipment 500 from a remote source (e.g., from user equipment device 404 by way of communications network 414).

The media guidance application may generate for display, on display 312 of user equipment device 500, an illustrative display including optional storage confirmation message 506 and optional media asset identifier confirmation message 508. Optional storage confirmation message 506 and optional media asset identifier confirmation message 508 are depicted as visual in FIG. 5, but the media guidance application may alternatively or additionally present audio confirmation (e.g., by way of speakers 314) or tactile confirmation (e.g., a series of vibrations generated using a vibration motor implemented in user equipment device 500).

The media guidance application may present optional storage confirmation message 506 to the user in response to the media guidance application causing the portion of the media asset to be stored. For example, if the media guidance application identifies a free video-on-demand service as a source of the requested portion of "Star Wars Episode 1: The Phantom Menace" and causes the portion to be stored, the media guidance application may generate for display, on display 312, optional storage confirmation message 506 with the phrase "The requested portion has been saved" (not shown). The media guidance application may also present optional storage confirmation message 506 to the user if a future recording has been scheduled. For example, the media guidance application may generate for display, on display 312, optional storage confirmation message 506 with the phrase, "Found it!" (as shown in FIG. 5). The media guidance application may also present optional storage confirmation message 506 to the user in order to confirm that the user would like to use the identified source. For example, if the media guidance application can only find the portion of the media asset at a source that requires a purchase payment in order to access the media asset, the media guidance application may generate for display, on display 312, optional storage confirmation message 506 showing "Found it! Would you like to buy 'Star Wars Episode 1: The Phantom Menace' for $5.99?" (not shown).

The media guidance application may also include in optional storage confirmation message 506, when user equipment device 500 has a display screen, a video clip of a preview of the portion of the media asset that has been stored. The media guidance application may also provide, using optional storage confirmation message 506, an option for the user to view the portion of the media asset.

The media guidance application may present optional media asset identifier confirmation message 508 to the user in response to the media guidance application finding a media asset identifier that is close to, but does not necessarily match, the media asset identifier contained in command 504. For example, if the media guidance application determines that command 504 includes the media asset identifier "Star Wars 1," the media guidance application may generate for display, on display 312, optional media asset identifier confirmation message 508 with the phrase, "'Star Wars Episode 1: The Phantom Menace'—is this what you mean?" (as shown in FIG. 5).

The media guidance application may determine that a media asset identifier is close to but does not match the media asset identifier contained in command 504 in a variety of ways as described below. In some embodiments, the media guidance application may determine (e.g., using control circuitry 304) that the command comprises a received media asset identifier (i.e., a media asset identifier that is received from the user). For example, the media guidance application may detect that the user has, in command 504, requested a media asset using a brief description. The media guidance application may then access (e.g., via control circuitry 304) a database (e.g., located at server 608 or storage circuitry 308) comprising a plurality of known media asset identifiers. For example, the media guidance application may access a locally stored list of descriptions or summaries of available media assets. After accessing the database, the media guidance application may cross-reference (e.g., using control circuitry 304) the received media asset identifier against the plurality of known media asset identifiers. Based on this cross-referencing, the media guidance application may then determine that the received media asset identifier does not match any known media asset identifier of the plurality of known media asset identifiers. For example, if the media guidance application determines that the user has requested a media asset using a brief description, the media guidance application may determine (e.g., using control circuitry 304) that the description the user specified does not match any of the descriptions in the database (i.e., that each term, word, or character in the received media asset identifier is not the same as those of any media asset identifier known to the database).

The media guidance application may then calculate (e.g., using control circuitry 304) a set of similarity metrics for the plurality of known media asset identifiers. A similarity metric may correspond to a degree of similarity between the received media asset identifier and the known media asset identifier. For example, the media guidance application may compute the similarity metric such that it corresponds to how close the description received from the user is to a given media asset description in the database. The media guidance application may calculate this based on a number of identical or synonymous words used, a probability that the description supplied by the user corresponds to the same category or genre as a given media asset, or any other suitable method or combination thereof. The process of calculating a similarity metric is discussed in greater detail below in FIG. 12.

The media guidance application may then determine (e.g., using control circuitry 304) that a similarity metric of the set of similarity metrics exceeds a threshold similarity metric. For example, if the media guidance application determines that a similarity metric exceeds the threshold, this may signal to the media guidance application that at least one of the known media asset identifiers is a potential match. Based on this determination, the media guidance application may then select a suggested media asset identifier. The media guidance application may also provide to the user an option to confirm that that suggested media asset identifier corresponds to the received media asset identifier (e.g., optional media asset identifier confirmation message 508). For example, if the media guidance application determines that the user has requested "The show with the irritable doctor," the media guidance application may suggest "House" (a television show whose titular character is both a doctor and irritable) as a potential match. In this case, the media guidance application may detect that the command references (i) a primary character (ii) who is a doctor and (iii) whose main trait is irritability. The media guidance application may then cross-reference this information against relevant fields in the database of known media asset identifiers.

The media guidance application may also present optional media asset identifier confirmation message 508 to the user in response to the media guidance application being unable to find any suitable media asset identifier based on command 504. For example, in that case, the media guidance application may, using optional media asset identifier confirmation message 508, prompt the user to input another media asset identifier.

The media guidance application may also prompt the user to confirm, using optional media asset identifier confirmation message 508, that the command referenced a particular media asset or portion of the media asset. In doing this, the media guidance application may include in optional media asset identifier confirmation message 508 a preview of the media asset or portion of the media asset. For example, the media guidance application may determine that the command comprises an instruction to store the opening scene from "Star Wars Episode 1: The Phantom Menace." The media guidance application may generate for display, on display 312, optional media asset identifier confirmation message 508 with the phrase "Did you mean this scene?" with a short preview of the opening scene of the movie.

In some embodiments, the media guidance application (e.g., via control circuitry 304) receives a command from a user. In FIG. 5, command 504 is received, as an illustrative example, via microphone 502. Command 504 may be any input that user input interface 310 is able to understand (e.g., tactile input or gestural input). The media guidance application may receive command 504 via control circuitry 304 by monitoring the environment for any known user interaction (such as by listening for one of a set of recognized keywords) or by accepting a command after receiving a user indication that a command is to follow (e.g., the user depresses a button and the media guidance application prompts the user for a command). For example, in FIG. 5, the media guidance application has received command 504, which comprises an instruction to store a portion of "Star Wars Episode 1: The Phantom Menace."

In some embodiments, the media guidance application may determine (e.g., via control circuitry 304) that the command comprises an instruction to store a portion of a media asset, wherein the portion is less than the entire media asset. For example, the media guidance application may, using control circuitry 304, determine that command 504 (received via microphone 502) comprises an instruction to store a scene from "Star Wars Episode 1: The Phantom Menace."

The media guidance application may then identify (e.g., via control circuitry 304) a source of the portion of the media asset. For example, the media guidance application may search a list of Internet-based content providers (e.g., via communications network 414) for an available version of the portion of the media asset. The source (such as media content source 416) may be any suitable provider of which the media guidance application is aware. For example, the media guidance application may store (e.g., at storage circuitry 308) a list of media asset sources preferred by the user.

The media guidance application may identify the source (e.g., media content source 416) according to rules. The media guidance application may set these rules by default, according to user preferences or inputs (e.g., stored at storage circuitry 308), or based on data received from a profiling database (e.g., media guidance data source 418). For example, the media guidance application may only identify a future broadcast of the media asset as a source if the broadcast occurs within a certain period of time. In this case, the media guidance application may set a rule governing the maximum time until the next broadcast. If the media guidance application finds no such future broadcast, it may then search for on-demand or Internet-based content sources. In doing so, the media guidance application may apply a rule governing the preferred order in which sources are searched or used.

Similarly, the media guidance application may evaluate the appropriateness of a paid content source as a source for the portion of the media asset according to rules. For example, if the media guidance application determines that the price of the media asset from the paid source is below a certain threshold (e.g., a maximum price point set by default or by user preferences), the media guidance application may automatically purchase the media asset. If the media guidance application determines that the price is above the threshold, the media guidance application may prompt the user to authorize the purchase if there are no free sources available. In another example, the media guidance application may determine that a low-quality version of the portion of the media asset is available from a free source and a high-quality version is available from a paid source. The media guidance application may automatically select the paid source, the free source, or prompt the user to select a source based on the difference in quality, price of the paid source, purchase history of the user, or any other appropriate criteria or any combination thereof. As before, these rules may be set by the user or by default.

In some cases, the media guidance application may detect that the versions of the media asset provided by each potential source may differ from one another. For example, the media guidance application may receive a user request for a portion of "Star Wars Episode 1: The Phantom Menace" based on a theatrical release version the user is currently viewing. The media guidance application may take this into account and preferentially search for other unaltered versions of the movie. If the media guidance application determines that the version available from the identified source (e.g., media content source 416) does differ from the version the user is viewing, the media guidance application may detect these differences and modify the command accordingly. For example, the version of "Star Wars Episode 1: The Phantom Menace" from the source the media guidance application identifies may have advertisements inserted into it, altering the play time and thus the starting and ending positions of the requested portion of the media asset. The media guidance application may detect the advertisements (e.g., via metadata transmitted with the media asset or by analyzing the media asset to find the transitions between the movie and the advertisements) and alter the starting position and ending position of the requested portion as necessary to account for the time added by the advertisements.

In some embodiments, the media guidance application may, using control circuitry 304, determine that command 504 comprises a request for a specific version of the media asset. For example, the media guidance application may detect certain key words associated with different versions of media assets, including but not limited to "TV version," "original version," "unedited version," and "director's cut." The media guidance application may then, following the process described above for identifying a source (e.g., media content source 416), identify a source of the specified version of the media asset. If no source can be found for the specified version of the media asset, the media guidance application may notify the user via optional media asset identifier confirmation message 508. In some cases, the media guidance application may also prompt the user (e.g., also using optional media asset identifier confirmation message 508) to select an alternate version of the media asset.

In other cases, the media guidance application may automatically select an alternate version of the media asset and a corresponding source of that alternate version of the media asset. The media guidance application may make this selection based on the rules for identifying sources discussed previously, user preferences, or any other suitable criteria. For example, the media guidance application may detect that command 504 comprises a request for the "original version" of a media asset. The media guidance application may also determine based on user preferences that the user prefers to watch the TV version of media assets. If the media guidance application cannot identify a source for the original version of the media asset (as requested), the media guidance application may instead automatically identify a source for the TV version of the media asset. In another example, the media guidance application may identify a source for the TV version of the media asset because it is the only version available from a free source.

In another example, the media guidance application may select an alternate version of the media asset based on an intended use of the media asset. For example, the media guidance application may determine that command 504 (received from a user) comprises an instruction to store a portion of the media asset "Goodfellas." The media guidance application may also detect that command 504 comprises a device identifier corresponding to a device belonging to a different user. For example, if the media guidance application determines that command 504 comprises the phrase "Record this scene and then share with Charlie's phone," the media guidance application may determine that the stored portion of the media asset (i.e., the scene from "Goodfellas") is meant to be shared with another user (i.e., Charlie). The process of causing a portion of a media asset to be stored on a device other than the device at which the command is received is discussed in further detail below with regard to FIG. 7.

The media guidance application may then select an appropriate version of the media asset based on this intended use and/or the identity of the other user. For example, the media guidance application may determine, based on user preferences or default programming, that the TV version of a media asset should be used (if available) whenever the portion of the media asset is intended to be shared with another user. In this case, the media guidance application would select and identify a source of the TV version of "Goodfellas" because it has detected that command 504 indicates that the scene is intended for Charlie. In another example, the media guidance application may determine, based on a user profile for Charlie (e.g., located at storage circuitry 308 or accessed from a remote source via communications network 414), that Charlie prefers the original version of media assets. In this case, based on this determination, the media guidance application would select and identify a source of the original version of "Goodfellas."

Alternatively, if the media guidance application does not detect that command 504 comprises a device identifier corresponding to a device belonging to a different user, the media guidance application may select an alternate version of the media asset according to user preferences, as discussed above. In this case, the media guidance application may determine that the user prefers unedited versions of media assets. Since the media guidance application has determined that the scene from "Goodfellas" is not intended for another user, it may then select and identify a source of the unedited version of the movie (as described above).

The media guidance application may then cause the portion of the media asset to be stored (e.g., at storage circuitry 308). For example, the media guidance application may schedule a recording (e.g., via control circuitry 304) of the portion of the media asset from a future broadcast of the media asset. The portion of the media asset may then be stored (e.g., at a remote server or at local storage such as storage circuitry 308) to be later accessed at user equipment device 500 (e.g., via communications network 414). In another example, the media guidance application may cause the portion of the media asset to be stored from a real-time Internet-based stream of the media asset. In another example, the media guidance application may retrieve or download the portion of the media asset from a remote server (e.g., media content source 416) at which the portion or entirety of the media asset is stored.

In some embodiments, the media guidance application may determine that command 504 comprises an indication of a duration of the portion of the media asset. For example, the media guidance application may determine that the command includes an instruction to store the last ten minutes of a media asset. The indication may be received via user input interface 310 (in FIG. 5, via microphone 502). In general, as discussed previously, the command may comprise an instruction to store at least one of a specific scene, clip, chapter, interview, trailer, advertisement, and outtake from or related to the media asset. The command may also comprise an instruction to store a plurality of portions of the media asset that are related to one another. For example, the portions may contain a certain actor, be associated with a threshold number of mentions or interactions on social media, contain a certain type of music, be associated with a certain mood, be scheduled for recording by friends of the user, or any other appropriate criteria or any combination thereof.

For example, if the user is watching "Star Wars Episode 1: The Phantom Menace," the media guidance application may detect that the user has issued a command (e.g., command 504) comprising an instruction to store all scenes containing the character Darth Maul. As discussed previously, the command may be explicit (e.g., "Record all scenes with Darth Maul") or implied (e.g., "Darth Maul is awesome in this!" or "That double lightsaber is so cool!"). In this case, the media guidance application may determine that the duration of each of the plurality of portions of the media asset would be the length of each scene (as determined, for example, using metadata transmitted with the media asset, by analyzing the media asset for scene transitions, or any other suitable method). The media guidance application may then request only specific scenes using this information or may go through the entirety of the media asset to find and mark or extract these scenes for later playback.

In instances when the media guidance application detects that the indication of the duration is unclear or absent (such as the "That double lightsaber is so cool!" example given above), the media guidance application may determine an appropriate portion or plurality of portions to cause to be stored. For example, the media guidance application may use natural language processing and video recognition techniques (here, to find a lightsaber that is different from the others) or perform an Internet search (here, to find out that the character Darth Maul uses a double lightsaber in "Star Wars Episode 1: The Phantom Menace"). The media guidance application may then, according to default settings, user preferences, or a user command history, store all scenes relating to the command, only the first scene relating to the command, or take any other appropriate action.

In another example, if the user is watching "Star Wars Episode 1: The Phantom Menace," the media guidance application may detect that the user has issued a command (e.g., command 504) comprising an instruction to store the trailer for the movie or for related movies. In this case, the duration of the portion of the media asset, as determined by the media guidance application, would be the length of the trailer.

The media guidance application may then determine (e.g., via control circuitry 304) a starting position and an ending position of the portion of the media asset based on the indication. For example, the media guidance application may determine (e.g., using control circuitry 304) that "the last ten minutes" contained in command 504 detected by microphone 502 corresponds to a starting position ten minutes before the end of the media asset and an ending position of the end of the media asset. The media guidance application may, once a source of the portion of the media asset is identified (e.g., source 610), query the source for the length of the entirety of the media asset in order to find the starting position. The media guidance application may then cause the portion of the media asset that elapses between the starting position and the ending position to be stored. For example, in this case, only the last ten minutes of the media asset would be stored. The media guidance application may also, if no explicit indication of a duration is given, automatically select, by default or according to user preferences, a portion of the media asset corresponding to what the user is currently viewing. For example, the media guidance application may cause a portion of the media asset with a starting position two minutes before the command was detected and an ending position two minutes after the command was detected to be stored (e.g., at storage circuitry 308).

In some embodiments, the media guidance application may determine, using control circuitry 304, the correct portion of the media asset (and, more specifically, the starting position of the portion of the media asset) by determining a part of the media asset being viewed by the user at the time the command was detected. The media guidance application may do this in part by determining an initial source of the portion of the media asset. For example, if, when the media guidance application detects a command comprising an instruction to cause a portion of a media asset to be stored, the user is watching a television program at a sports bar, the initial source of the portion of the media asset would be the source of the program at the sports bar (e.g., a specific broadcast channel, video-on-demand service, or any other suitable source).

In some embodiments, the media guidance application may determine the initial source of the portion of the media asset by recognizing, using control circuitry 304, the identity of the media asset based on the location of the user. For example, in this case, the media guidance application may, using control circuitry 304, recognize the location of the user (i.e., the sports bar) and the content or content provider associated with the media asset (here, sports-related content and content providers). Using this information, the media guidance application may identify the initial source of the media asset associated with the command and thereby be able to determine a source of the portion of the media asset.

In another example, the media guidance application may determine, using control circuitry 304, that the user is watching "Star Wars Episode 1: The Phantom Menace" while at home. The media guidance application may determine, in this case, what channels would be available to the user (based on information about channels the user is subscribed to or channels available at the home location of the user). The media guidance application may also determine, based on detected audio and/or video signals, that the user is watching "Star Wars Episode 1: The Phantom Menace." The media guidance application may then search schedule data (e.g., from media guidance data source 418) to find the initial source of the portion of the media asset (for example, a local broadcast station).

The media guidance application may also determine, using control circuitry 304, the run time (i.e., the total length) of the media asset. For example, the media guidance application may determine (e.g., based on an Internet search via communications network 414) that the run time of the theatrical release of "Star Wars Episode 1: The Phantom Menace" is 133 minutes. In another example, the media guidance application may determine that the run time of "Star Wars Episode 1: The Phantom Menace" on the local broadcast station, once advertisements and edits are included, is 165 minutes (e.g., based on a query to media guidance data source 418). Similarly, the media guidance application may also determine the starting time of the media asset from the initial source. For example, the media guidance application may, based on information received from media guidance data source 418, determine that the showing of "Star Wars Episode 1: The Phantom Menace" on the local broadcast station began at 2:00 PM. The media guidance application may also determine the time at which the command to store the portion of the media asset was detected. For example, the media guidance application may determine, using control circuitry 304, that the command was detected at 2:35 PM.

The media guidance application may then determine, based on at least one of these previously described determinations (of the initial source of the media asset, original run time, modified run time, broadcast start time, and time at which the command was received), which portion of the media asset should be stored and the correct starting position of that portion. For example, as discussed, the media guidance application may determine that (i) the command comprised an instruction to store the current scene from "Star Wars Episode 1: The Phantom Menace"; (ii) the initial source of the movie is a local broadcast station; (iii) the movie started at 2:00 PM; (iv) the movie has had advertisements inserted into it, so its scheduled run time is 165 minutes; (v) the command was detected at 2:35 PM (i.e., 35 minutes into the run time of the movie from the initial source); and (vi) the identified source from which the portion of the media asset will be retrieved and stored has the theatrical release of the movie, which has a run time of 133 minutes. Based on any combination of this information, the media guidance application may determine a starting position for the portion of the media asset from the identified source that corresponds to the point at which the user command was detected in the initial source. For example, in this case, while the media guidance application detected the command 35 minutes into the movie as presented by the initial source, the media guidance application may determine that, due to advertisements in the broadcast (e.g., determined by querying media guidance data source 418), the corresponding starting position for the portion of the media asset is 28 minutes into the theatrical release.

In some embodiments, the media guidance application may detect a signal associated with the media asset. For example, the media guidance application may detect a video signal containing video from the media asset (e.g., via user interface 310 integrated with microphone 504 and accessible to user equipment device 500). The media guidance application may then determine (e.g., via control circuitry 304) a fingerprint associated with the media asset based on the signal. A fingerprint may be any data structure generated from the detected signal that is uniquely representative of the signal and can be compared to other fingerprints. Accordingly, two identical signatures would correspond to the same signal. For example, the media guidance application may determine a video fingerprint for the detected video signal. The media guidance application may determine this fingerprint by identifying and analyzing unique components of the video signal containing video from the media asset. Examples of such components or characteristics include, but are not limited to, color distributions, luminance distributions, and changes in selected points between frames of the video signal (e.g., a degree of difference or a direction of motion).

The media guidance application may then access a database comprising a plurality of known fingerprints. For example, the database (e.g., located at media guidance data source 422 and accessed via communications network 414) may comprise a list of previously determined fingerprints for a plurality of media assets. The media guidance application may then cross-reference (e.g., via control circuitry 304) the fingerprint with the plurality of known fingerprints and determine the identity of the source of the portion of the media asset based on the cross-referencing. For example, the media guidance application may compare the fingerprint to the list of previously determined fingerprints to find the closest match. The media guidance application may determine that two fingerprints match based on a determination of a mathematical distance between the two fingerprints. For example, the media guidance application may compute the Hamming distance between the two fingerprints. If the media guidance application determines that the Hamming distance falls below a given numerical threshold (e.g., set by default or based on a user preference of how close the fingerprints must be to one another), the media guidance application may determine that the two fingerprints match. The media guidance application may then use this information to identify the portion of the media asset originally requested by the user, identify a source of the portion of the media asset, and cause the portion to be stored.

The media guidance application may also determine, using control circuitry 304, the initial source of the portion of the media asset based on signals detected by the media guidance application relating to the media asset. For example, when the media guidance application detects the user command (e.g., command 504), it may activate signal-detecting components of the user device (e.g., a camera and/or microphone 502 of user equipment device 500). The media guidance application may use these detected signals (e.g., by generating and cross-referencing fingerprints as described above) alone or in conjunction with the other methods described herein to identify the initial source of the portion of the media asset. For example, the media guidance application may detect an audio signal relating to the media asset and, using an acoustic fingerprint, determine that the media asset is "Star Wars Episode 1: The Phantom Menace." The media guidance application may then determine the source or sources from which "Star Wars Episode 1: The Phantom Menace" would have been available to the user at the time the command was detected.

The media guidance application may also determine, using control circuitry 304, the starting position of the portion of the media asset using these detected signals. Once the media asset itself is identified (e.g., using a fingerprint generated from the detected signal), the media guidance application may identify a source of the media asset (as described herein), retrieve the media asset, and search it for data that matches the previously detected signal. The determination of whether or not the data matches the detected signal may be performed as for the determination of whether or not two fingerprints match. The media guidance application may then base the starting position on this matching point. For example, if a video signal has been detected, the media guidance application may find, using control circuitry 304, a matching frame or frames within the retrieved media asset. In another example, if an audio signal has been detected, the media guidance application may find, using control circuitry 304, a matching audio segment within the retrieved media asset.

In some embodiments, the media guidance application may detect a device identifier in the instruction. For example, the media guidance application may receive a user instruction to store the portion of the media asset on "my phone" (where "my phone" is the device identifier). The media guidance application may then determine (e.g., via control circuitry 304) which device the device identifier corresponds to based on a user profile. For example, the media guidance application may recognize that the term "my phone" refers to a specific device associated with the user based on a user profile (e.g., located at storage circuitry 308). The media guidance application may then cause the portion of the media asset to be stored at the device. For example, the media guidance application may then cause the portion of the media asset to be stored on user equipment device 500 and not on another device associated with the user. The media guidance application may include the name of the identified device in optional storage confirmation message 506.

In some cases, the media guidance application may determine that the device identifier may refer to an explicit name. For example, the media guidance application may know the name of the user or a custom name given to a user device (such as user equipment device 500) through user preferences or account information. In such a case, the media guidance application may detect a device identifier in the command (e.g., command 504) that uses that name.

For example, the media guidance application may detect that a user named Susan has referred to "Susan's laptop" rather than "my laptop" in a command. The media guidance application may detect the device identifier "Susan's laptop" in the command given by the user (e.g., command 504). The media guidance application may then cross-reference the device identifier against a database of device identifiers known to the media guidance application (e.g., located at storage circuitry 308). Based on this cross-referencing, the media guidance application may determine that the device identifier (here, "Susan's laptop") is among those that it knows and cause the portion of the media asset to be stored at the corresponding device. If the media guidance application determines that the device identifier is not among those that it knows, it may determine a suggested device identifier (e.g., using the similarity metric discussed herein). The media guidance application may then prompt the user to confirm that the suggested device identifier corresponds to the correct device. Finally, the media guidance application may cause the portion of the media asset to be stored at the device corresponding to the suggested device identifier (if the user confirms that it corresponds to the correct device) or prompt the user to input another device identifier (if the suggested device identifier does not correspond to the correct device).

In some cases, the device identifier may be ambiguous. For example, the media guidance application may determine that the user has two phones but has detected the device identifier "my phone" in the user's command (e.g., command 504). The media guidance application may then determine the most appropriate user device based on default settings, user preferences, or a user command history. For example, if the media guidance application determines that command 504 comprises an instruction to store a portion of "Star Wars Episode 1: The Phantom Menace" on "my phone" and the user has two phones, the media guidance application may determine, using control circuitry 304, which phone the user saves media to more frequently. Alternatively, the media guidance application may determine that the user prefers to save all media assets to one phone unless otherwise specified.

The media guidance application may also detect that the device identifier comprises a specific folder or other file location on the specified user device. As for the devices themselves, the file location may be explicit (e.g., "Susan's Favorites folder"), implied (e.g., "My Favorites folder"), ambiguous (e.g., "a folder"), or absent. The media guidance application may determine the most appropriate file location for the portion of the media asset based on the same determinations as for the devices.

The media guidance application may also detect (e.g., using control circuitry 304) that the device identifier identifies a device to which the stored portion of the media asset should be transferred. The transfer may take place using a local connection or over communications network 414, using any suitable protocol. For example, the media guidance application may determine that the portion of the media asset should be transferred as the portion is being stored. In another example, the media guidance application may determine that the portion should be transferred after the storage operation is complete. This determination may be made based on default settings, user preferences, or the detected content of command 504. The media guidance application may notify the user (e.g., using optional storage confirmation message 506) about the status and completion of the transfer.

The media guidance application may also, once the source of the portion of the media asset has been identified and the device has been determined, generate for display (e.g., via control circuitry 304) a storage confirmation message, such as optional storage confirmation message 506. For example, the media guidance application may generate for display, on display 312, a message confirming that the portion of the media asset has been found and a retrieved copy will soon be stored on the identified device. If the media guidance application determines that the user device at which the command was received does not have the capability to generate for display a storage confirmation message (i.e., it does not have a screen), the media guidance application may communicate the confirmation message in a different manner. For example, the media guidance application may communicate an audio version of the message to the user (e.g., via speakers 314) or generate the message for display by a different user device (e.g., a target device on which the portion of the media asset has been stored). The message may identify the media asset, user, identified device, or any other relevant storage-related information or any combination thereof.

The media guidance application may also use optional storage confirmation message 506 to communicate information to the user or prompt the user to perform an action if the media guidance application determines that there is insufficient space (e.g., at storage circuitry 308) to act on the user's command. For example, the media guidance application may detect that storage circuitry 308 of user equipment device 500 does not have enough free space to store the portion of the media asset that the user has requested. The media guidance application may, in some cases, automatically delete another stored piece of content (e.g., the piece of content with the earliest date of storage or a previously viewed piece of content) and, to inform the user of this, present optional storage confirmation message 506. In other cases, the media guidance application may, using optional storage confirmation message 506, ask the user to select a piece of content to be deleted. For example, the media guidance application may generate for display, on display 312, optional storage confirmation message 506 with the phrase "There is not enough space to store the opening scene of 'Star Wars Episode 1: The Phantom Menace'. Would you like to delete a saved program?" Upon receiving a selection of a piece of content to delete, the media guidance application may delete the selected piece of content and store the requested portion of the media asset. Alternatively, the media guidance application may detect that the user has chosen not to delete any piece of content, in which case the media guidance application may cancel the storage operation.

In another example, the media guidance application may detect that a user command (e.g., command 504) comprises an instruction to cause an entire media asset to be stored but that there is only enough space (e.g., at storage circuitry 308) to store a portion of the media asset. The media guidance application may use optional storage confirmation message 506 to ask the user to select a portion to be stored. For example, the media guidance application may generate for display, on display 312, optional storage confirmation message 506 with the phrase "There is not enough space to store the opening scene of 'Star Wars Episode 1: The Phantom Menace'. Would you like to store a specific scene?" Alternatively, the media guidance application may automatically select a portion or a plurality of portions of the media asset to be stored based on user preferences (e.g., all scenes containing a favorite actor), defaults (e.g., the first five minutes of the media asset to act as a preview), or any other appropriate criteria or combination thereof. As before, the media guidance application may detect that the user has not chosen a portion of the media asset, in which case the media guidance application may cancel the storage operation.

In some embodiments, the media guidance application may determine that the portion of the media asset has been partially played at an initial source corresponding to the instruction. For example, if the media guidance application determines that the user has requested that the opening scene from an ongoing television broadcast currently in progress on user equipment device 500 be stored, the media guidance application may determine (e.g., via control circuitry 304) that the opening scene has already been partially played. In response to this determination, the media guidance application may then identify a secondary source (e.g., source 710) for the portion of the media asset. The media guidance application may identify the secondary source in the same manner or using the same rules as previously discussed for the identification of a source. For example, the media guidance application may search a list of Internet-based streaming content providers (e.g., located at storage circuitry 308) and identify a future scheduled or on-demand stream of the media asset as the secondary source for the portion of the media asset.

Figure 6:
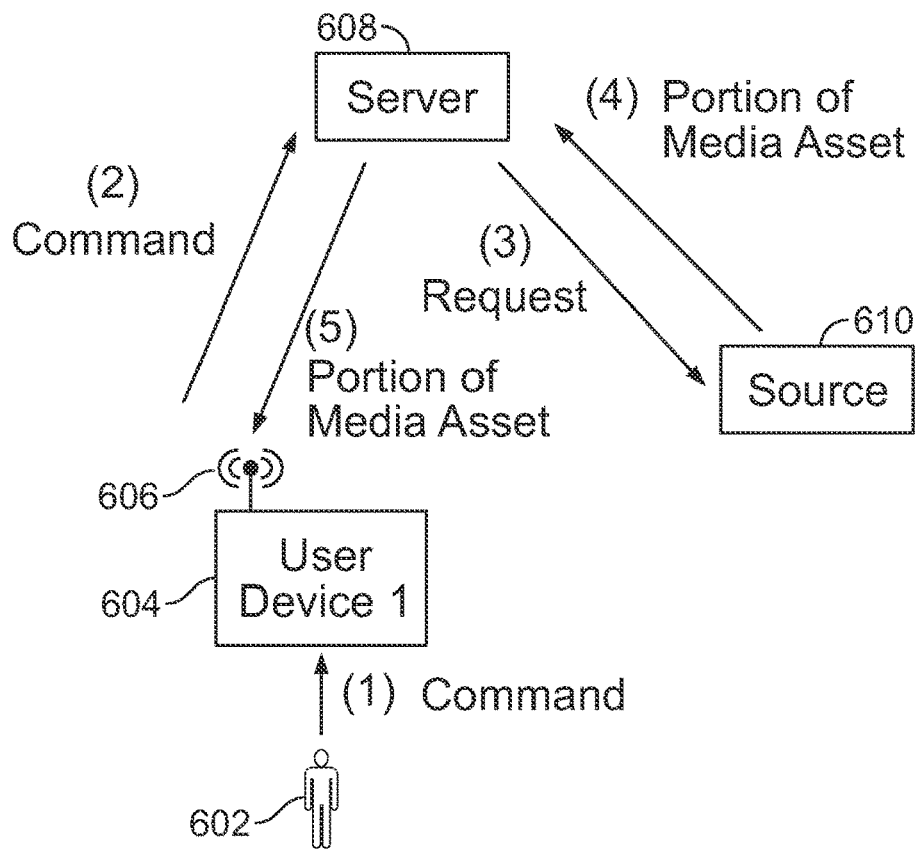
FIG. 6 shows an illustrative embodiment of a system that may process and act upon a user command to cause a portion of a media asset to be stored on a user device at which the command was received in accordance with some embodiments of the disclosure.

FIG. 6 shows an illustrative embodiment of a system that may process and act upon a user command to cause a portion of a media asset to be stored on a user device at which the command was received in accordance with some embodiments of the disclosure. In FIG. 6, a media guidance application implemented on first user device 604 detects that user 602 has issued a command (e.g., command 504) to the media guidance application. First user device 604 may be, for example, user equipment device 500 and perform its functionality.

The media guidance application may, using control circuitry 304, determine that the command (e.g., command 504) comprises an instruction to store a portion of a media asset at first user device 604 (e.g., at storage circuitry 308). For example, as discussed with regard to FIG. 5, the media guidance application may determine that user 602 has issued a command to the media guidance application implemented on first user device 604 to store a portion of "Star Wars Episode 1: The Phantom Menace."

The media guidance application may also determine whether user 602 and/or first user device 604 has permission to access the portion of the media asset. The media guidance application may make this determination by requesting from first user device 604 a list of media assets that user 602 and/or first user device 604 has permission to access, requesting a password from user 602, cross-referencing user 602 and/or first user device 604 against a list of users and user devices known to have permission to access the portion of the media asset, or by using any other appropriate method. If the media guidance application determines that user 602 and/or first user device 604 does not have permission to access the portion of the media asset, the media guidance application may provide to user 602, using first user device 604 (e.g., by generating for display optional storage confirmation message 506 on display 312), an indication that user 602 and/or first user device 604 does not have permission to access the portion of the media asset. In the example discussed here, the media guidance application may determine that user 602 does not have permission to access the requested portion of "Star Wars Episode 1: The Phantom Menace" from a future broadcast on a premium channel but that user 602 does have permission to access it from a given on-demand source.

If the media guidance application determines that user 602 and/or first user device 604 does have permission to access the portion of the media asset, the media guidance application may then suitably encode the command using control circuitry 304 and transmit it, over communications network 414 by way of transmitter 606, to server 608. Transmitter 606 may be a wireless transmitter, such as a cellular transmitter or a Wi-Fi transmitter (as shown in FIG. 6). Transmitter 606 may also denote a wired connection, such as an Ethernet connection or an internal wired connection. Server 608 may be located locally or remote from first user device 604. Server 608 may include all functionality of first user device 604 or be implemented on first user device 604. Server 608 may be associated with and/or operated by a vendor that provides the media guidance application. Server 608 may implement the functionality of media guidance data source 418 and/or media content source 416. Server 608 may comprise a database of known sources, known media asset identifiers, or other data associated with media assets. Server 608 may also comprise control circuitry (such as control circuitry 304) for processing complex tasks not handled by first user device 604. In the example discussed here, the media guidance application may encode the command comprising an instruction to store a portion of "Star Wars Episode 1: The Phantom Menace" and transmit it using transmitter 606 to server 608.

The media guidance application may then request that server 608 then transmit a request for the portion of the media asset to source 610. This transmission may occur by using any known query language, such as SQL, to generate a query addressed to source 610. In some instances, source 610 is co-located with server 608. In some instances, source 610 and server 608 are one integrated device. In some instances, source 610 and server 608 are located remotely from one another. In the example discussed here, server 608 will transmit a request for the portion of "Star Wars Episode 1: The Phantom Menace" to source 610 (here, a given on-demand source). The request from server 608 to source 610 may be for the entirety of the media asset or, if applicable, for just the portion itself.

Server 608 may then receive the portion of the media asset from source 610. The media guidance application may request that server 608 process the portion of the media asset (e.g., by re-encoding, reformatting, or otherwise modifying it) such that it is suitable for first user device 604. For example, if the portion of the media asset, as received from source 610, is in a format that first user device 604 cannot display, the media guidance application may request that server 608 reformat the portion of the media asset (e.g., into an appropriate format determined by the media guidance application querying first user device 604). In another example, if server 608 received the entirety of the media asset from source 610, the media guidance application may request that server 608 extract the portion of the media asset to transmit to first user device 604. The media guidance application may also perform any of these functions (e.g., processing the portion of the media asset or extracting the portion of the media asset) using control circuitry 304. The media guidance application may also find the starting position and ending position of the portion within the media asset in order to generate appropriate playback markers for first user device 604. Server 608 may then transmit the portion of the media asset to first user device 604, again over communications network 414 by way of transmitter 606. The media guidance application may the cause the portion of the media asset to be stored (e.g., at storage circuitry 308 of first user device 604).

For example, server 608 may receive the entirety of "Star Wars Episode 1: The Phantom Menace" from source 610 but know (from command 504 transmitted from first user device 604 via transmitter 606) that user 602 only wants to store the opening scene of the movie. The media guidance application may, when it receives the media asset from server 608, then extract the opening scene from the media asset received from source 610, encode it in a format playable by first user device 604, and cause the portion of the media asset to be stored at first user device 604.

Figure 7:
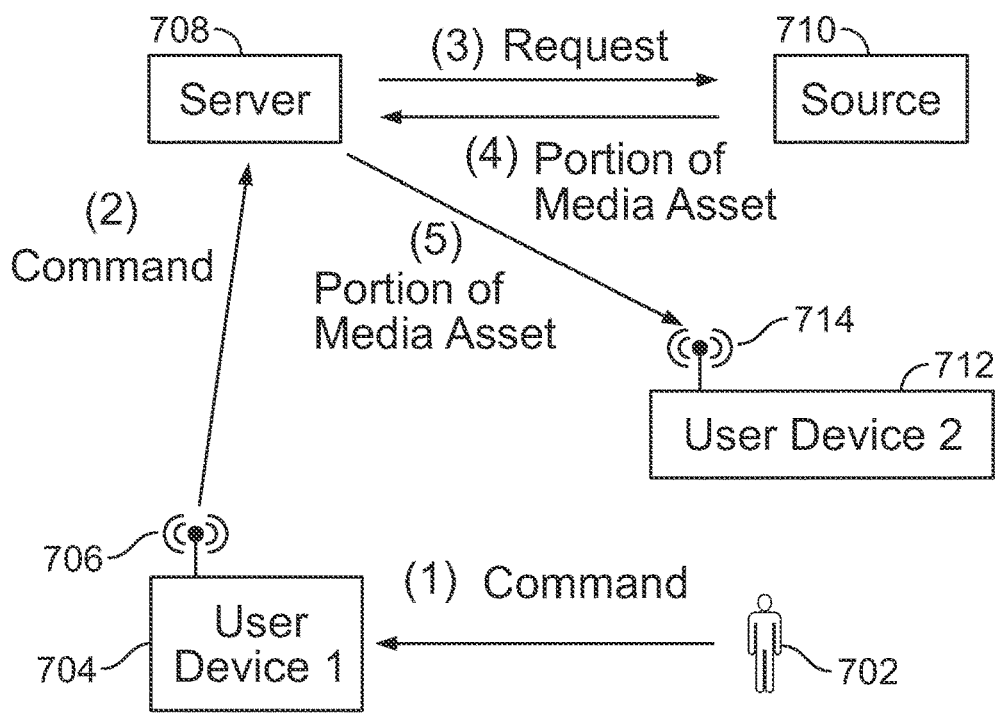
FIG. 7 shows an illustrative embodiment of a system that may process and act upon a user command to cause a portion of a media asset to be stored on a second user device in accordance with some embodiments of the disclosure.

FIG. 7 shows an illustrative embodiment of a system that may process and act upon a user command to cause a portion of a media asset to be stored on a second user device in accordance with some embodiments of the disclosure. As in FIG. 6, the media guidance application detects that user 702 has issued a command to first user device 704, and encodes it and transmits it, using transmitter 706, to server 708. In this case, the command comprises an instruction to store a portion of a media asset at second user device 712 rather than at first user device 704. Both first user device 704 and second user device 712 perform the functionality of user equipment device 500.

Similar to FIG. 6, the media guidance application may, using control circuitry 304, determine that the command (e.g., command 504) comprises an instruction to store a portion of a media asset at second user device 712 (e.g., at storage circuitry 308). For example, as discussed with regard to FIG. 5, the media guidance application may detect that user 702 has issued a command to the media guidance application implemented on first user device 704 to store a portion of "Star Wars Episode 1: The Phantom Menace" on second user device 712 (e.g., another user device belonging to or associated with user 702).

The media guidance application may also determine whether second user device 712 and/or a user associated with second user device 712 (e.g., user 702 or another user, not shown) has permission to access the portion of the media asset. As before, the media guidance application may make this determination by requesting from first user device 704 or second user device 712 a list of media assets that user 702 and/or second user device 712 has permission to access, requesting a password from user 702, cross-referencing user 702 and/or second user device 712 against a list of users and user devices known to have permission to access the portion of the media asset, or by using any other appropriate method. If the media guidance application determines that user 702, another user associated with second user device 712 (not shown), and/or second user device 712 does not have permission to access the portion of the media asset, the media guidance application may provide to user 702, using first user device 704 (e.g., by generating for display optional storage confirmation message 506 on display 312), an indication that user 702, another user associated with second user device 712 (not shown), and/or second user device 712 does not have permission to access the portion of the media asset. In the example discussed here, the media guidance application may determine that second user device 712 does not have permission to access the requested portion of "Star Wars Episode 1: The Phantom Menace" from a future broadcast on a premium channel but that second user device 712 does have permission to access it from a given on-demand source.

If the media guidance application determines that user 702, another user associated with second user device 712 (not shown), and/or second user device 712 does have permission to access the portion of the media asset, the media guidance application may then suitably encode the command using control circuitry 304 and transmit it, over communications network 414 by way of transmitter 706, to server 708. As before, transmitter 706 may be a wireless transmitter, such as a cellular transmitter or a Wi-Fi transmitter (as shown in FIG. 7). Transmitter 706 may also denote a wired connection, such as an Ethernet connection or an internal wired connection. Server 708 may be located locally or remote from first user device 704 and/or second user device 712. Server 708 may include all functionality of or be implemented on first user device 704 and/or second user device 712. Server 708 may be associated with and/or operated by a vendor that provides the media guidance application. Server 708 may be media guidance data source 418. Server 708 may comprise a database of known sources, known media asset identifiers, or other data associated with media assets. Server 708 may also comprise control circuitry (such as control circuitry 304) for processing complex tasks not handled by first user device 704 and/or second user device 712. In the example discussed here, the media guidance application implemented on first user device 704 may encode the command comprising an instruction to store a portion of "Star Wars Episode 1: The Phantom Menace" on second user device 712 and transmit it using transmitter 706 to server 708 for further processing.

The media guidance application may then request that server 708 transmit a request for the portion of the media asset to source 710. This transmission may occur by using any known query language, such as SQL, to generate a query addressed to source 710. In some instances, source 710 is co-located with server 708. In some instances, source 710 and server 708 are one integrated device. In some instances, source 710 and server 708 are located remotely from one another. In the example discussed here, server 708 will transmit a request, as instructed by the media guidance application, for the portion of "Star Wars Episode 1: The Phantom Menace" to source 710 (here, a given on-demand source). The request may be for the entirety of the media asset or, if applicable, for just the portion itself.

Server 708 may then receive the portion of the media asset from source 710. The media guidance application may request that server 708 process the portion of the media asset (e.g., by re-encoding, reformatting, or otherwise modifying it) such that it is suitable for second user device 712, and then transmit it to second user device 712 (over communications network 414 by way of second device transmitter 714). For example, if the portion of the media asset, as received from source 710, is in a format that first user device 704 can display but second user device 712 cannot display, the media guidance application may request that server 708 reformat the portion of the media asset (e.g., into an appropriate format determined by the media guidance application querying second user device 712). In another example, if server 708 received the entirety of the media asset from source 710, the media guidance application may request that server 708 extract the portion of the media asset to transmit to second user device 712. As before, the media guidance application may perform these actions (processing the portion of the media asset and/or extracting it from the entirety of the media asset) at first user device 704 or second user device 712. The media application may also find the starting position and ending position of the portion within the media asset in order to transmit appropriate playback markers to second user device 712. Second user device 712 may then store the portion of the media asset (e.g., at storage circuitry 308).

Figure 8:
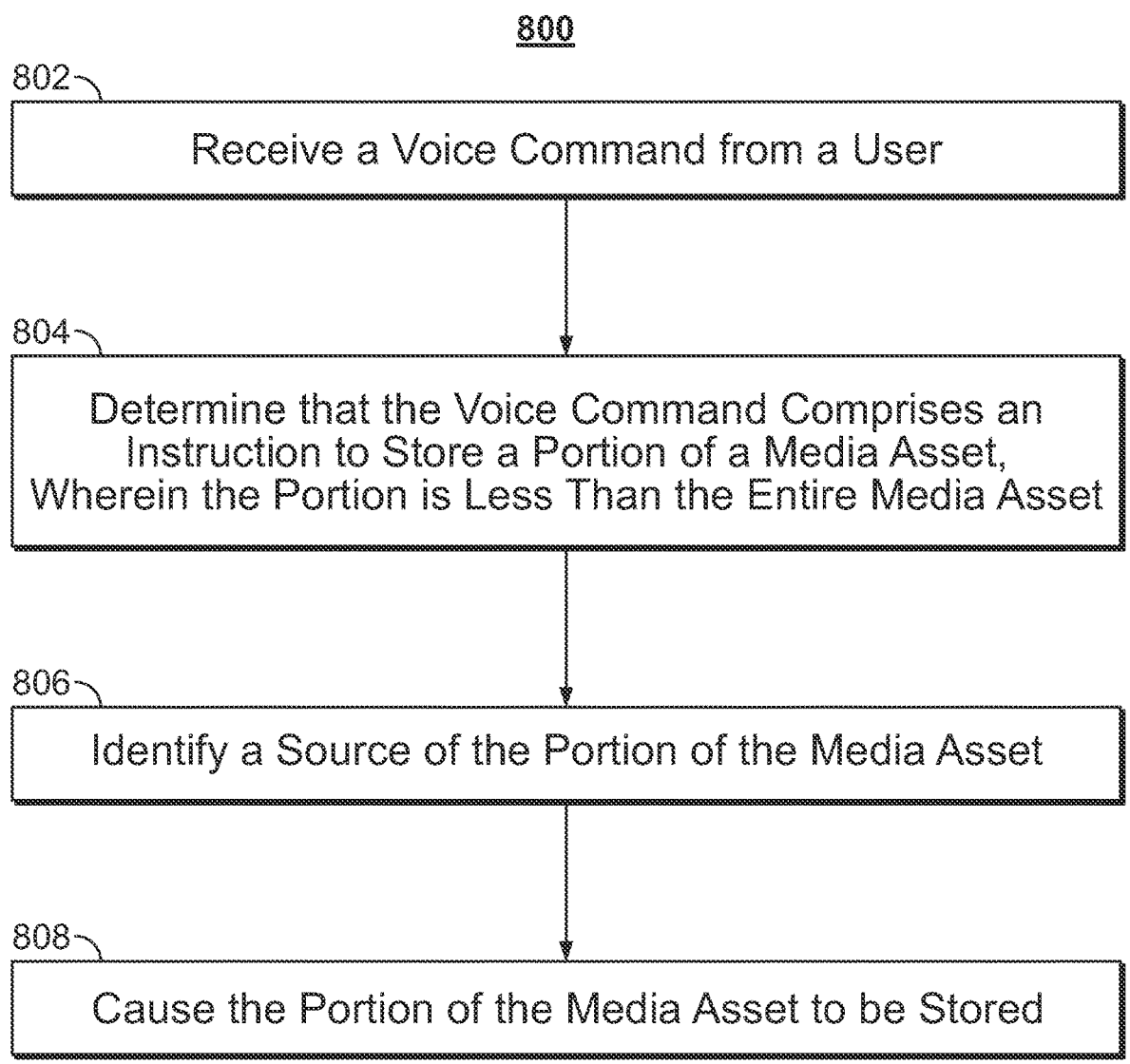
FIG. 8 is a flowchart of illustrative steps for storing a portion of a media asset based on a command received from a user in accordance with some embodiments of the disclosure.

FIG. 8 is a flowchart of illustrative steps for storing a portion of a media asset based on a command received from a user in accordance with some embodiments of the disclosure. It should be noted that process 800 or any step thereof could be performed on, or provided by, any of the devices shown in FIGS. 3-7. For example, process 800 may be executed by control circuitry 304 (FIG. 3) as instructed by control circuitry implemented on user equipment 402, 404, and/or 406 (FIG. 4) to cause a portion of a media asset to be stored. In addition, one or more steps of process 800 may be incorporated into or combined with one or more steps of any other process or embodiment.

At 802, the media guidance application receives a voice command from a user. For example, a media guidance application implemented on user equipment device 500 may receive command 504 via microphone 502.

At 804, the media guidance application determines that the voice command comprises an instruction to store a portion of a media asset, wherein the portion is less than the entire media asset. For example, the media guidance application may, using voice recognition techniques executed on control circuitry 304, identify keywords associated with a storage command.

At 806, the media guidance application identifies a source of the portion of the media asset. In some embodiments, the media guidance application may contact a remote server, such as server 608 or media guidance data source 418, to identify a source. In other embodiments, the media guidance application may access a locally stored (e.g., at storage circuitry 308) list of suitable content sources.

In some embodiments, the media guidance application determining a source of the portion of the media asset may comprise the media guidance application recognizing, using control circuitry 304, the identity of the media asset based on the location of the user, the time of the request, and the channel, provider, or other source the user was viewing at the time the command was issued. For example, the user may be watching a show broadcast via a service that the user does not normally receive (e.g., the user is at a friend's house and the friend subscribes to a different cable provider than the user). The media guidance application may, using control circuitry 304, recognize the location of the user (i.e., the friend's house, which may be saved in a user profile), the content provider associated with the media asset (i.e., the friend's cable television provider, also saved in a user profile), and the time the command was issued. Using this information, the media guidance application may recognize the media asset associated with the command and thereby be able to determine a source of the portion of the media asset.

At 808, the media guidance application causes, using control circuitry 304, the portion of the media asset to be stored (e.g., at storage circuitry 308). In some embodiments, the portion of the media asset is retrieved from a remote database (e.g., source 610 or source 710) and stored (e.g., at storage circuitry 308). In other embodiments, a recording of a future broadcast of the portion of the media asset may be scheduled.

In some embodiments, the media guidance application may, using control circuitry 304, cause the entirety of the media asset to be stored (e.g., at storage circuitry 308). The media guidance application may then, using control circuitry 304, also store a pointer to the start of the requested portion of the media asset. When the media guidance application detects that a user has requested playback of the portion of the media asset, the media guidance application may then use said pointer to initiate playback of the stored media asset at the start of the requested portion. In this manner, the media guidance application may facilitate interaction with the portion of the media asset while allowing for later access to other parts of the media asset.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 8.

Figure 9:
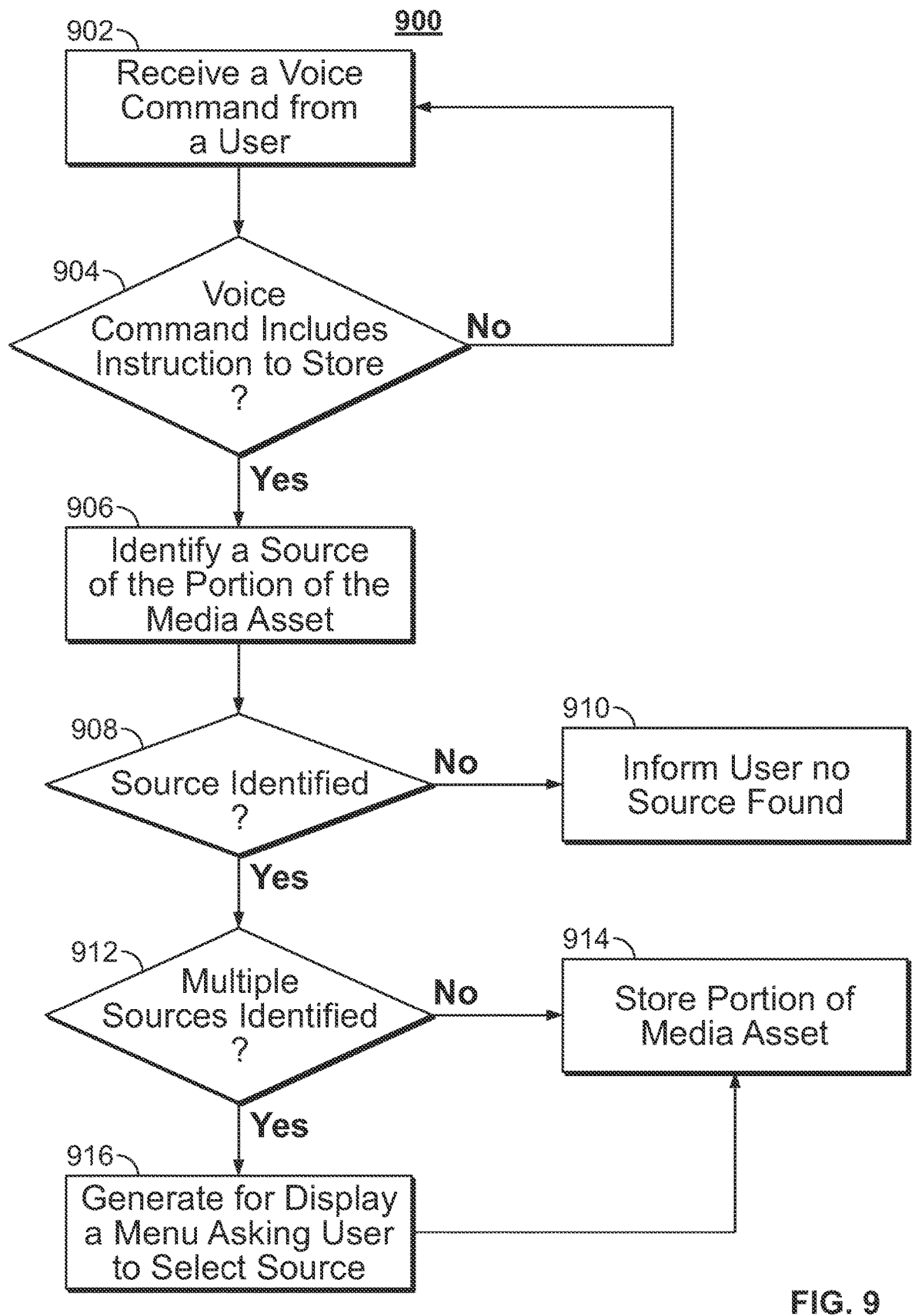
FIG. 9 is a flowchart of illustrative steps for storing a portion of a media asset when multiple sources are identified in accordance with some embodiments of the disclosure.

FIG. 9 is a flowchart of illustrative steps for storing a portion of a media asset when multiple sources are identified in accordance with some embodiments of the disclosure. It should be noted that process 900 or any step thereof could be performed on, or provided by, any of the devices shown in FIGS. 3-7. For example, process 900 may be executed by control circuitry 304 (FIG. 3) as instructed by control circuitry implemented on user equipment 402, 404, and/or 406 (FIG. 4) to cause a portion of a media asset to be stored when multiple sources are identified. In addition, one or more steps of process 900 may be incorporated into or combined with one or more steps of any other process or embodiment.

At 902, as at 802 of FIG. 8, the media guidance application receives a voice command (e.g., command 504 via microphone 502) from a user. At 904, the media guidance application may determine, using control circuitry 304, whether the voice command includes an instruction to store a portion of a media asset. If not, the media guidance application may return to 902 to receive another voice command from the user or, if applicable, may act on the command in the appropriate manner (not shown).

If the media guidance application determines, using control circuitry 304, that the voice command includes an instruction to store a portion of a media asset, the media guidance application may then proceed to 906. At 906, the media guidance application may, as at 806, identify a source of the portion of the media asset using control circuitry 304. In some embodiments, the media guidance application may access a list of known sources of portions of media assets, available locally or at a remote database (e.g., media guidance data source 418). In other embodiments, the media guidance application may perform a broader Internet search (e.g., using communications network 414) to find a suitable source.

At 908, the media guidance application may determine (e.g., using control circuitry 304) whether a source has been identified. If the media guidance application has not identified a source, the media guidance application may proceed to 910 and inform the user that no source has been found. For example, the media guidance application may generate for display (e.g., on display 312 of user equipment device 500) a notification message to this effect. In another example, the media guidance application may generate an audio message (e.g., to be played via speakers 314).

In some embodiments, if the media guidance application has not identified a source, the media guidance application may present to the user a set of selectable options of categories of clips that could be recorded. These categories may include but are not limited to "a fantastic sports game," "an amazing live show," "a beautiful natural sight," and "an entertaining party." These categories may be set by default, according to user preferences, or based on available programming. For example, the media guidance application may not present the option to record a clip from "a fantastic sports game" if there are no sports games currently being broadcast.

If the media guidance application detects (e.g., using control circuitry 304) that the user has selected one of the categories, it may identify and store a clip corresponding to the selected category. In some cases, the media guidance application may access a database of prerecorded clips corresponding to categories (e.g., media content source 416). The media guidance application may then select one of the prerecorded clips to be stored. In other cases, the media guidance application may search for media assets corresponding to the selected category (e.g., using media guidance data source 418). The media guidance application may then select a media asset and/or a clip from a media asset to store. This selection may be done at random, according to user preferences, according to user selection, according to popularity of the clips with other users, or based on any other suitable criteria.

If the media guidance application has identified a source, the media guidance application may proceed to 912. At 912, the media guidance application may determine, using control circuitry 304, if multiple sources have been identified. If the media guidance application has not identified multiple sources (i.e., the media guidance application has identified a single source for the portion of the media asset), the media guidance application may proceed to 914 and, using control circuitry 304, cause the portion of the media asset to be stored (e.g., at storage circuitry 308, as at 808 of FIG. 8).

If the media guidance application has identified multiple sources of the portion of the media asset, the media guidance application may proceed to 916. At 916, the media guidance application may generate for display (e.g., on display 312) a menu asking the user to select a source to use from the plurality of identified sources. When the media guidance application detects that the user has made a selection, the media guidance application may then use the selected source in order to, using control circuitry 304, cause the portion of the media asset to be stored (e.g., at storage circuitry 308) at 914.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 9.

Figure 10:
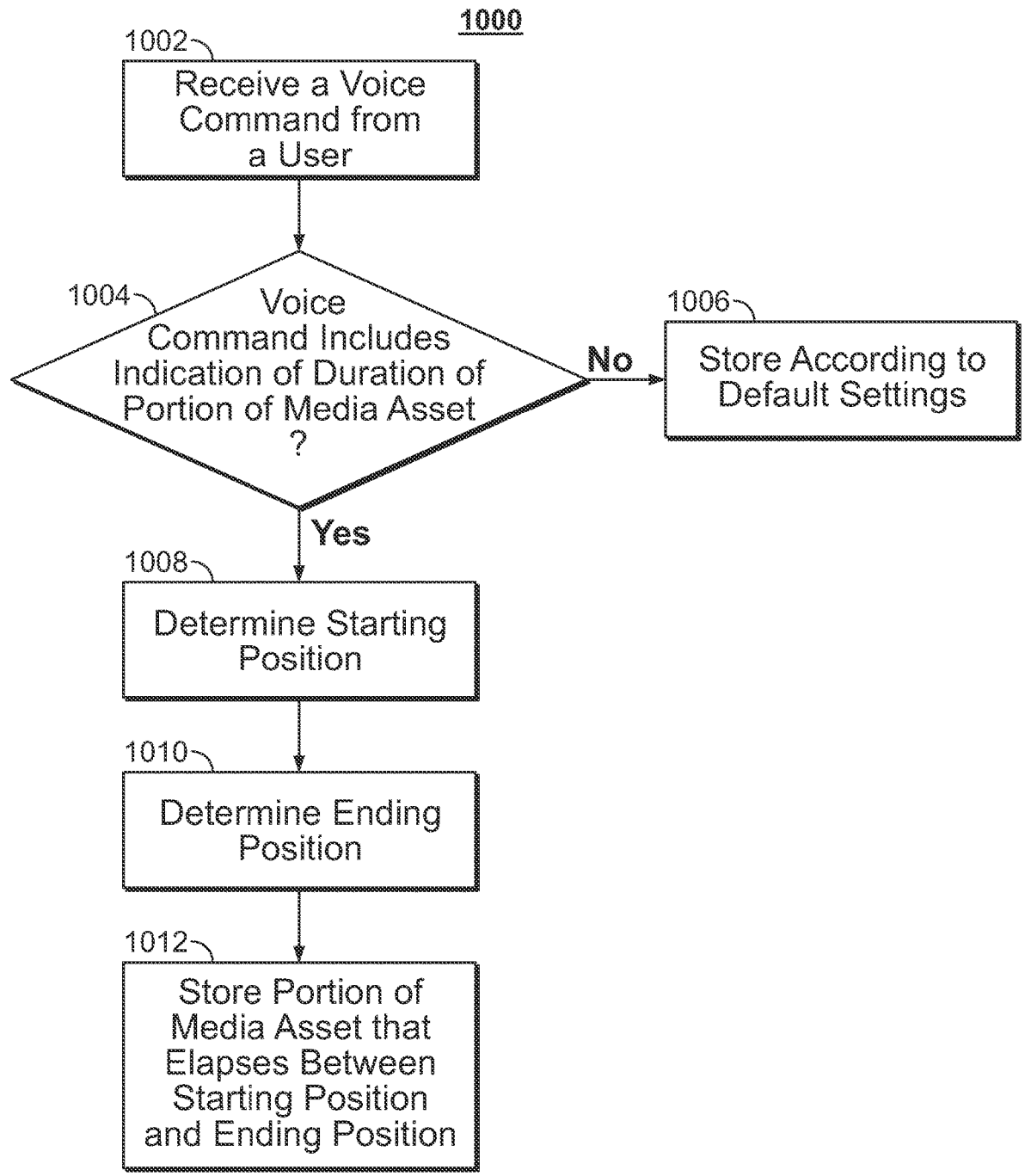
FIG. 10 is a flowchart of illustrative steps for storing a portion of a media asset when a starting position and an ending position of the portion have been indicated by the user in accordance with some embodiments of the disclosure.

FIG. 10 is a flowchart of illustrative steps for storing a portion of a media asset when a starting position and an ending position of the portion have been indicated by the user in accordance with some embodiments of the disclosure. It should be noted that process 1000 or any step thereof could be performed on, or provided by, any of the devices shown in FIGS. 3-7. For example, process 1000 may be executed by control circuitry 304 (FIG. 3) as instructed by control circuitry implemented on user equipment 402, 404, and/or 406 (FIG. 4) to cause a portion of a media asset to be stored when a starting position and an ending position of the portion have been indicated by the user. In addition, one or more steps of process 1000 may be incorporated into or combined with one or more steps of any other process or embodiment.

At 1002, as at 802 of FIG. 8, the media guidance application receives a voice command (e.g., command 504 via microphone 502) from a user. At 1004, the media guidance application may determine, using control circuitry 304, whether the voice command includes an indication of a duration of a portion of a media asset. For example, the media guidance application may determine that the user indicated that "the first five minutes" or "the next 10 minutes" or "this scene" from the media asset should be stored. In some embodiments, the media guidance application may determine, using control circuitry 304, that the user has requested a scene, clip, chapter, interview, trailer, advertisement, or outtake from or related to the media asset. As stated previously, the indication may be relative (e.g., "the next five minutes") or absolute (e.g., "from the 30-minute mark to the 45-minute mark").

In some embodiments, the media guidance application may determine, using control circuitry 304, the starting position of the portion of the media asset based on the broadcast time of the media asset and the time the command was issued. For example, if the media guidance application detects that the user issued the command to store the current portion of the media asset at 4:35 PM and the media guidance application determines that the media asset was scheduled to begin at 4:30 PM, the media guidance application would set the starting position to be five minutes into the runtime of the media asset.

In other embodiments, the media guidance application may determine the starting position of the portion of the media asset, using control circuitry 304, based on a video signal detected by the user device (e.g., user equipment device 500). As discussed previously, the media guidance application may use a detected video signal to identify a source of the portion of the media asset. Once the media guidance application has identified a source, the media guidance application may also determine, using control circuitry 304, the starting position of the portion of the media asset by comparing the detected video signal to the identified source. For example, the media guidance application may match a frame from the detected video signal to a frame from the media asset from the identified source. The media guidance application may then use the point within the media asset corresponding to said frame as the starting point of the portion of the media asset.

If the media guidance application determines that the voice command does not include an indication of a duration of a portion of the media asset, the media guidance application may proceed to 1006. At 1006, the media guidance application may cause a portion of the media asset to be stored (e.g., at storage circuitry 308) according to the default settings of the media guidance application. In some embodiments, the settings may be user-specified. In some embodiments, the settings may be stored locally (e.g., at storage circuitry 308). In other embodiments, the media guidance application may retrieve the settings from a remote database (e.g., via communications network 414). For example, the media guidance application may be set to cause the current scene from the specified media asset to be stored (e.g., at storage circuitry 308) in the absence of an indicated duration of the portion of the media asset.

If the media guidance application detects that the voice command does include an indication of a duration of a portion of the media asset, the media guidance application may proceed to 1008. At 1008, the media guidance application determines, using control circuitry 304, a starting position for the portion of the media asset. For example, if the media guidance application detects that the user has requested the next scene from the media asset, the media guidance application may determine, using control circuitry 304, that the starting position corresponds to the scene transition between the current scene and the next scene. Any other suitable point of demarcation may be used.

At 1010, the media guidance application determines, using control circuitry 304, an ending position for the portion of the media asset. For example, if the media guidance application detects that the user has requested the last ten minutes from the media asset, the media guidance application may determine, using control circuitry 304, that the ending position corresponds to the end of the media asset. As with the starting position, any other suitable point of demarcation may be used.

At 1012, the media guidance application may cause the portion of the media asset that elapses between the starting position and the ending position to be stored (e.g., at storage circuitry 308). The storage operation is carried out as at 808 of FIG. 8. For example, if the media guidance application detects that the user has requested the opening scene from a media asset, the media guidance application may retrieve that scene from a remote source (e.g., via communications network 414) or record it from a future broadcast of the media asset using the beginning of the media asset as the starting position and the transition to the second scene as the ending position.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 10.

Figure 11:
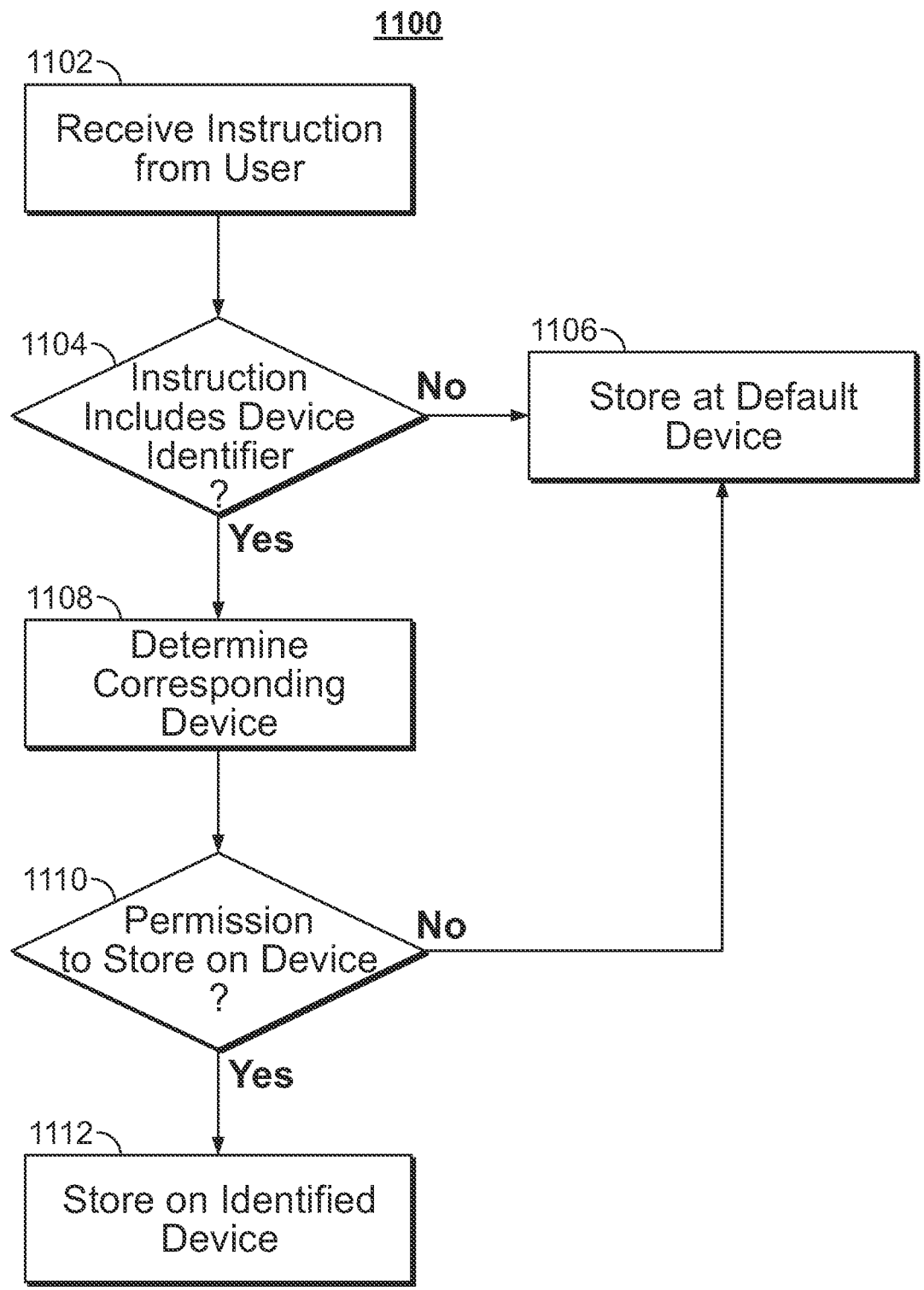
FIG. 11 is a flowchart of illustrative steps for storing a portion of a media asset at an identified device in accordance with some embodiments of the disclosure.

FIG. 11 is a flowchart of illustrative steps for storing a portion of a media asset at an identified device in accordance with some embodiments of the disclosure. It should be noted that process 1100 or any step thereof could be performed on, or provided by, any of the devices shown in FIGS. 3-7. For example, process 1100 may be executed by control circuitry 304 (FIG. 3) as instructed by control circuitry implemented on user equipment 402, 404, and/or 406 (FIG. 4) to cause a portion of a media asset to be stored at an identified device. In addition, one or more steps of process 1100 may be incorporated into or combined with one or more steps of any other process or embodiment.

At 1102, the media guidance application may, using control circuitry 304, receive an instruction from a user (e.g., in command 504 received via microphone 502). At 1104, the media guidance application may determine, using control circuitry 304, whether the instruction includes a device identifier. For example, the media guidance application may determine that the device identifier refers to a user device associated with the user from whom the instruction was received (e.g., "my laptop" or "my DVR"). In another example, the media guidance application may determine that the device identifier refers to a user device associated with another user but to which the media guidance application may have access (e.g., "my friend's phone" or "my parents' tablet").

If the media guidance application does not detect a device identifier, the media guidance application may proceed to 1106. At 1106, the media guidance application causes, using control circuitry 304, the portion of the media asset to be stored at a default or preferred (as set by user preferences) device (e.g., at storage circuitry 308). For example, the media guidance application may be set to store the portion of the media asset at the user device at which the instruction was received. In another example, the media guidance application may, by default, store the portion of the media asset at a certain location or device (e.g., at a remote server accessible by user devices via communications network 414).

In some embodiments, at 1106, the media guidance application may, using control circuitry 304, determine an available device at which to store the portion of the media asset. For example, the media guidance application may automatically record the portion of the media asset to the user's DVR (e.g., at storage circuitry 308) if at least one tuner is free at the time the command is issued. In another example, the media guidance application may determine, using control circuitry 304, which user device has the most bandwidth currently available. In yet another example, the media guidance application may determine, using control circuitry 304, which user device is currently performing the fewest storage-related operations (e.g., saving files, retrieving files, etc.). The media guidance application may make this determination using any such suitable technique or any combination thereof.

If the media guidance application detects a device identifier, the media guidance application may proceed to 1110. At 1110, the media guidance application may determine, using control circuitry 304, whether it has permission to cause the portion of the media asset to be stored on the specified device. For example, the media guidance application may access a list (e.g., located at storage circuitry 308 or at a remote database accessible via communications network 414) of devices to which it can store data. In another example, the media guidance application may transmit, using control circuitry 304, a request for permission to the user device specified by the device identifier.

If the media guidance application determines that it does not have permission to cause the portion of the media asset to be stored on the specified device, the media guidance application may return to 1106 and store the portion of the media asset at the default device. If the media guidance application determines that it does have permission, it may proceed to 1112. At 1112, the media guidance application may cause the portion of the media asset to be stored on the device corresponding to the device identifier (e.g., at storage circuitry 308). The storage operation may follow that of step 808 of FIG. 8.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 11.

Figure 12:
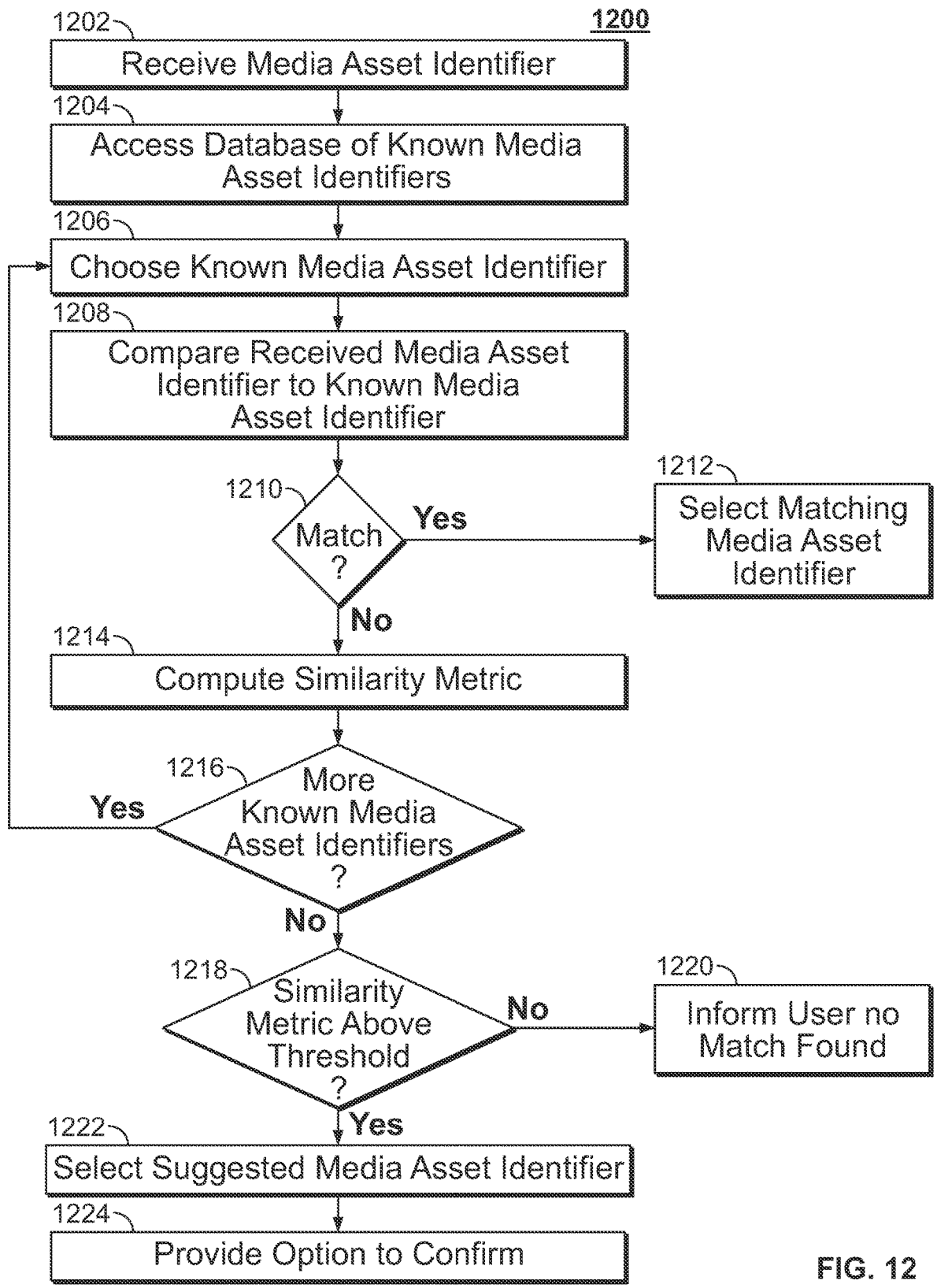
FIG. 12 is a flowchart of illustrative steps for selecting a suggested media asset identifier in response to the user providing a media asset identifier that does not match any media asset identifier known to a database in accordance with some embodiments of the disclosure.

FIG. 12 is a flowchart of illustrative steps for selecting a suggested media asset identifier in response to the user providing a media asset identifier that does not match any media asset identifier known to a database in accordance with some embodiments of the disclosure. It should be noted that process 1200 or any step thereof could be performed on, or provided by, any of the devices shown in FIGS. 3-7. For example, process 1200 may be executed by control circuitry 304 (FIG. 3) as instructed by control circuitry implemented on user equipment 402, 404, and/or 406 (FIG. 4) to select a suggested media asset identifier in response to the user providing a media asset identifier that does not match any media asset identifier known to a database. In addition, one or more steps of process 1200 may be incorporated into or combined with one or more steps of any other process or embodiment.

At 1202, the media guidance application may receive, using control circuitry 304, a media asset identifier. For example, the media guidance application may detect the media asset identifier in a voice command received by the media guidance program using microphone 502 of user equipment device 500.

At 1204, the media guidance application may, using control circuitry 304, access a database of known media asset identifiers. For example, the media guidance application may access a local database of known media asset identifiers (e.g., located at storage circuitry 308). In another example, the media guidance application may access, using communications network 414, a remote database of known media asset identifiers (e.g., located at server 608).

At 1206, the media guidance application may, using control circuitry 304, choose a known media asset identifier from the database of known media asset identifiers. For example, the media guidance application may select the first media asset identifier if the known media asset identifiers are stored in an ordered list.

At 1208, the media guidance application may, using control circuitry 304, compare the received media asset identifier to the known media asset identifier chosen at 1206. For example, if the media guidance application determines that the known media asset identifier is a string of characters, the media guidance application may, using control circuitry 304, perform a character-wise comparison of the two media asset identifiers. In this case, the media guidance application may determine that the received media asset identifier "The Princess Movie" matches characters from the known media asset identifiers "The Princess Bride" and "The Princess Diaries."

In another example, the media guidance application may, using control circuitry 304, search for words that appear in both the received and known media asset identifier, regardless of word order. In this case, the media guidance application may determine that the received media asset identifier "Star Trek: Khan's Wrath" has several words in common with the known media asset identifier "Star Trek II: The Wrath of Khan."

In yet another example, the media guidance application may search for keywords in both the received and known media asset identifier that signify that they belong to the same category (e.g., a genre, type of asset, etc.). In this case, the media guidance application may determine that the received media asset identifier "A Long Time Ago Out West" and the known media asset identifier "Once Upon a Time in the West" both refer to content belonging to the genre "Western" even though they have very few words in common. Any other suitable method of comparison or any combination thereof may be used.

At 1210, the media guidance application may determine, using control circuitry 304 and based on the comparison at 1208, whether the received media asset identifier matches the known media asset identifier chosen at 1206. For example, if the media guidance application performed the aforementioned character-wise comparison, the media guidance application may determine that the two identifiers match if all of their characters match. If the two identifiers match, the media guidance application may proceed to 1212 and select, using control circuitry 304, the matching known media asset identifier. The media guidance application may then use this media asset identifier to identify a source of a portion of the media asset identifier and cause that portion to be stored (as discussed previously, for example, at 806 and step 808 of FIG. 8).

If the media guidance application determines that the two identifiers do not match, the media guidance application may proceed to 1214. At 1214, the media guidance application may, using control circuitry 304, compute a similarity metric corresponding to a degree of similarity between the received media asset identifier and the known media asset identifier chosen at 1206. The similarity metric may be any appropriate measure based on the method of comparison being used.

For example, if the media guidance application is using a character-wise comparison, the similarity metric may be the number or percentage of characters that match between the two media asset identifiers. Using a previous example, the media guidance application may determine, using control circuitry 304, that the received media asset identifier "The Princess Movie" matches the first 11 non-blank characters of the known media asset identifiers "The Princess Bride" and "The Princess Diaries." The media guidance application may then set the similarity metric for both comparisons to be 11. Alternatively, the media guidance application may set the similarity metric for "The Princess Bride" to be 0.6875 (11 out of 16 non-blank characters) and the similarity metric for "The Princess Diaries" to be 0.6111 (11 out of 18 non-blank characters).

Similarly, if the media guidance application searches for common words between the two media asset identifiers, the number or percentage of matching words may be used. Returning again to a previous example, the media guidance application may determine, using control circuitry 304, that the received media asset identifier "Star Trek: Khan's Wrath" has three words that are the same as those in the known media asset identifier "Star Trek II: The Wrath of Khan" (or three-sevenths of the words).

In another example, if the media guidance application uses keywords to assign the media asset identifiers to categories (as discussed previously), the similarity metric may correspond to the likelihood that both media asset identifiers belong to the same category. From before, the media guidance application may determine, using control circuitry 304, that the received media asset identifier "A Long Time Ago Out West" and the known media asset identifier "Once Upon a Time in the West" are both highly likely to refer to content belonging to the genre "Western."

In some embodiments, the media guidance application, using control circuitry 304, may base the comparison and/or similarity metric in part on information retrieved from a user profile (e.g., located at storage circuitry 308 or accessed via communications network 414). For example, if the media guidance application detects, using control circuitry 304, that the user has requested "Star Wars 1" and the media guidance application determines that the user's profile indicates that the user enjoys science-fiction films from the 1970s, the media guidance application may suggest "Star Wars Episode 4: A New Hope" (i.e., the first Star Wars movie to be released) rather than "Star Wars Episode 1: The Phantom Menace" as a potential match. Without the user profile information, the media guidance application may suggest "Star Wars Episode 1: The Phantom Menace" due to the similarity of the titles. User profile information used in this manner by the media guidance application may include viewing history, purchase history, user-selected preferences, any other suitable information, or any combination thereof.

At 1216, the media guidance application may determine, using control circuitry 304, if there are additional known media asset identifiers in the database of known media asset identifiers. For example, if the known media asset identifiers are stored in an ordered list, the media guidance application may determine, using control circuitry 304, if it has reached the end of the ordered list. If there are additional known media asset identifiers, the media guidance application may return to 206 to choose another known media asset identifier for comparison.

If the media guidance application determines, using control circuitry 304, that there are no additional known media asset identifiers, the media guidance application may proceed to 1218. At 1218, the media guidance application may, using control circuitry 304, determine if any of the computed similarity metrics are above a given similarity threshold. The similarity threshold used by the media guidance application may be a minimum degree of similarity necessary for a potential match to be declared. For example, if the media guidance application bases the similarity metric on a character-wise or word-based comparison, the media guidance application may set the similarity threshold such that a certain percentage of the characters or words must match. In another example, if the media guidance application has assigned the media asset identifiers to categories based on keywords, the media guidance application may set the threshold such that the likelihood that the two media asset identifiers belong to the same category must be above a given level. Any such threshold appropriate to the similarity metric may be used.

If the media guidance application determines, using control circuitry 304, that none of the computed similarity metrics exceed the threshold, the media guidance application may proceed to 1220. At 1220, the media guidance application may, using control circuitry 304, inform the user that no match has been found. As at 910 of FIG. 9, the media guidance application may generate for display (e.g., on display 312) a notification message to this effect or may generate an audio message (e.g., to be played via speakers 314). Any other suitable means of notification, such as a tactile sensation (e.g., a vibration), or any combination thereof may be used as well.

If the media guidance application determines, using control circuitry 304, that at least one computed similarity metric exceeds the threshold, the media guidance application may proceed to 1222. At 1222, the media guidance application may, using control circuitry 304, select a suggested media asset identifier to present to the user. For example, the media asset identifier may select the known media asset identifier with the highest similarity metric to the received media asset identifier. In another example, the media guidance application may select the known media asset identifier whose similarity metric exceeds the threshold and aligns with the preferences of the user (e.g., based on saved user preferences or a user profile stored at storage circuitry 308 or accessible via communications network 414).

At 1224, the media guidance application may provide the user with an option to confirm that the selected media asset identifier corresponds to the media asset they requested. For example, the media guidance application may, on display 312 of user equipment device 500, generate for display media asset identifier confirmation message 508. In another example, the media guidance application may play an audio message (e.g., using speakers 314 of user equipment device 500) asking the user for confirmation (to be received using microphone 502 or user input interface 310).

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 12.

Figure 13:
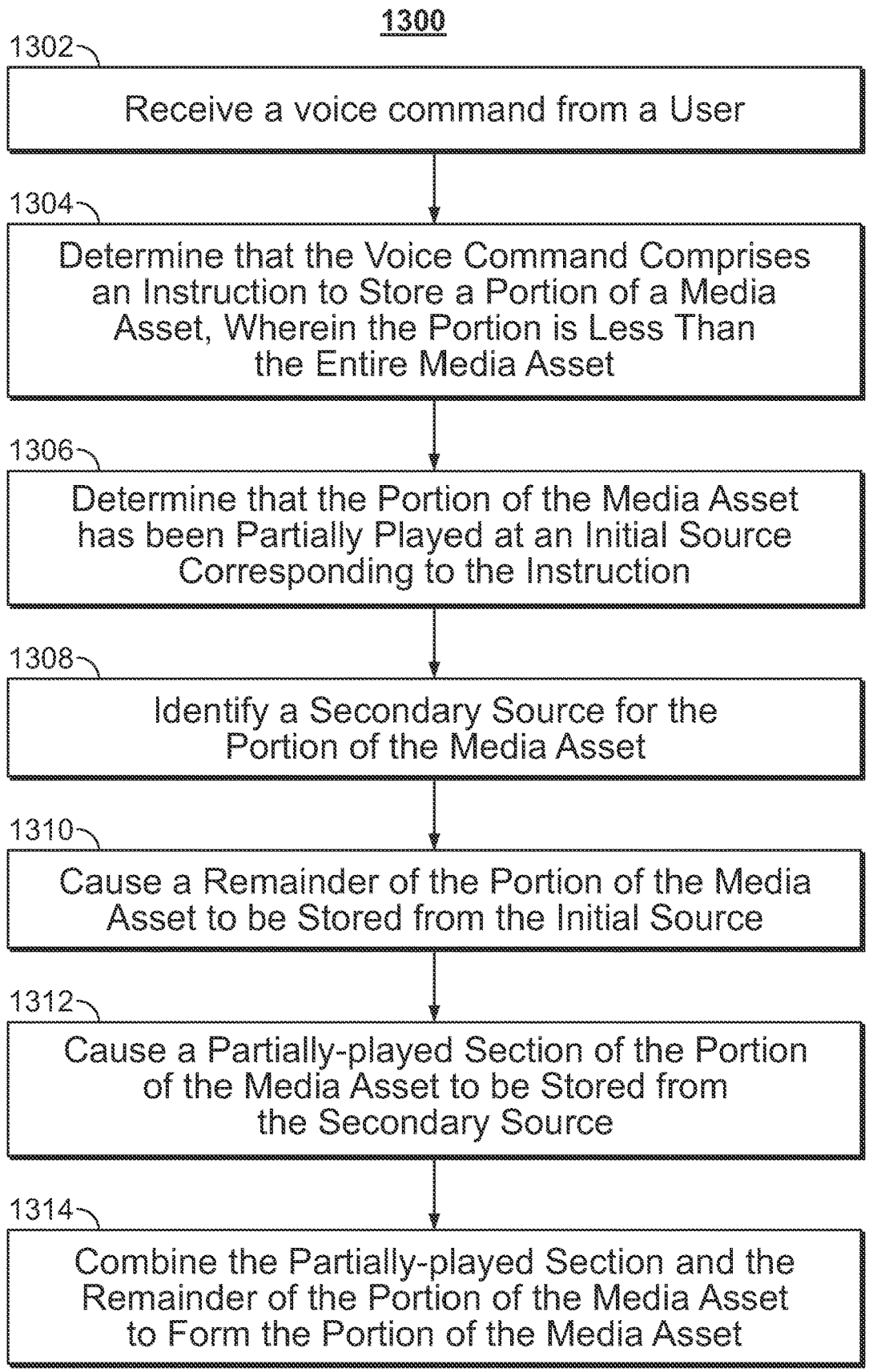
FIG. 13 is a flowchart of illustrative steps for combining sections of a portion of a media asset from multiple sources when a user requests the storage of a portion of a media asset that has already been partially played in accordance with some embodiments of the disclosure.

FIG. 13 is a flowchart of illustrative steps for combining sections of a portion of a media asset from multiple sources when a user requests the storage of a portion of a media asset that has already been partially played in accordance with some embodiments of the disclosure. It should be noted that process 1300 or any step thereof could be performed on, or provided by, any of the devices shown in FIGS. 3-7. For example, process 1300 may be executed by control circuitry 304 (FIG. 3) as instructed by control circuitry implemented on user equipment 402, 404, and/or 406 (FIG. 4) to combine sections of a portion of a media asset from multiple sources when a user requests the storage of a portion of a media asset that has already been partially played. In addition, one or more steps of process 1300 may be incorporated into or combined with one or more steps of any other process or embodiment.

At 1302, the media guidance application may, using control circuitry 304 and microphone 502, receive a voice command (e.g., command 504) from a user as at 802 of FIG.

8. At 1304, the media guidance application may, using control circuitry 304, determine that the voice command comprises an instruction to store a portion of a media asset, wherein the portion is less than the entire media asset. Again, this follows 804 of FIG. 8.

At 1306, the media guidance application may, using control circuitry 304, determine that the portion of the media asset has already been partially played at an initial source corresponding to the instruction. For example, if the user is watching a media asset on user equipment device 500, the media guidance application may detect that the user has instructed the media guidance application to store the current scene. The media guidance application may determine, using control circuitry 304, that at the time of the instruction, said scene would have already been partially played on user equipment device 500 (i.e., the initial source corresponding to the instruction). This partial playback may be detected by the media guidance application.

At 1308, the media guidance application may, using control circuitry 304, identify a secondary source for the portion of the media asset that is not the same as the initial source. As at 806 of FIG. 8, in some embodiments, the media guidance application may access a list of known sources of portions of media assets, available locally or at a remote database. In other embodiments, the media guidance application may perform a broader Internet search (e.g., using communications network 414) to find a suitable source.

At 1310, the media guidance application may, using control circuitry 304, cause a remainder of the portion of the media asset to be stored from the initial source. For example, the media guidance application may cause the remainder of the portion of the media asset that elapses between the time the instruction was received and the end of the portion to be stored (e.g., to storage circuitry 308).

At 1312, the media guidance application, using control circuitry 304, may cause a partially-played section of the portion of the media asset to be stored from the secondary source. For example, the media guidance application may cause the remainder of the portion of the media asset that elapses between the start of the portion of the media asset and the time the instruction was received to be stored (e.g., to storage circuitry 308). The media guidance application may store more than what was partially played at the initial source (e.g., to overlap with the remainder stored from the initial source to allow for discrepancies between the two sub-portions).

At 1314, the media guidance application may, using control circuitry 304, combine the partially-played section and the remainder of the portion of the media asset to form the entirety of the requested portion of the media asset. For example, the media guidance application may combine the two sections to form a single file (e.g., located at storage circuitry 308). In another example, the media guidance application may generate a link from one section to the other such that the two stored files may be played back seamlessly.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-7 could be used to perform one or more of the steps in FIG. 13.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, identification of a source of the portion of the media asset may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset correspondences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for resolving a command for a media asset, the method comprising:
   receiving a search query;
   determining that the search query comprises a portion of a media asset identifier;
   determining a similarity score for each available media asset identifier of a plurality of media asset identifiers based on the search query, wherein each similarity score indicates a degree of closeness between each respective available media asset identifier and the portion of the media asset identifier of the search query;
   in response to determining, based on the respective similarity score, that a number of matching words between each of the respective available media asset identifiers and the portion of the media asset identifier of the search query is below a threshold:
     identifying a category based on the portion of the media asset identifier of the search query; and
     identifying an available media asset identifier of the plurality of media asset identifiers that is associated with the identified category; and providing the identified available media asset identifier of the plurality of media asset identifiers that is associated with the identified category.

2. The method of claim 1, further comprising displaying an option to confirm that the subset of the available media asset identifiers of the plurality of media asset identifiers corresponds to the search query.

3. The method of claim 1, wherein determining the similarity score for the each available media asset identifier of the plurality of media asset identifiers comprises comparing a string of characters in the received search query comprising the portion of the media asset identifier to a string of characters in each of the available media asset identifiers of the plurality of media asset identifiers.

4. The method of claim 1, wherein determining the similarity score for the each available media asset identifier of the plurality of media asset identifiers comprises comparing words in the received search query comprising the portion of the media asset identifier to words in each of the available media asset identifiers of the plurality of media asset identifiers.

5. The method of claim 1, wherein determining the similarity score for the each available media asset identifier of the plurality of media asset identifiers comprises comparing keywords in the received search query comprising the portion of the media asset identifier to keywords in each of the available media asset identifiers of the plurality of media asset identifiers.

6. The method of claim 1, wherein identifying an available media asset identifier of the plurality of media asset identifiers that is associated with the identified category further comprises:
assigning the each available media asset identifier of the plurality of media asset identifiers to a category based on a keyword; and
determining a likelihood the received search query comprising the portion of the media asset identifier is assigned to the same category as the assigned each available media asset identifier of the plurality of media asset identifiers.

7. The method of claim 1, wherein determining the similarity score for the each available media asset identifier of the plurality of media asset identifiers is based at least in part on information retrieved from a user profile.

8. The method of claim 1, wherein providing the subset of the plurality of media asset identifiers comprises determining that the similarity score for the available media asset identifier of the plurality of media asset identifiers exceeds a threshold.

9. The method of claim 1, further comprising notifying a user that the received search query comprising the portion of the media asset identifier does not match any of the each of the available media asset identifiers of the plurality of media asset identifiers.

10. The method of claim 1, wherein the media asset identifier comprises any one or any combination of a title of the media asset, a nickname of the media asset, an abbreviation of the media asset, or a description of the media asset.

11. A system for resolving a command for a media asset, the system comprising:
input circuitry configured to receive a search query, wherein the search query comprises a portion of a media asset identifier; and
control circuitry configured to:
determine, a similarity score for each available media asset identifier of a plurality of media asset identifiers based on the search query wherein each similarity score indicates a degree of closeness between each respective available media asset identifier and the portion of the media asset identifier of the search query;
in response to determining, based on the respective similarity score, that a number of matching words between each of the respective available media asset identifiers and the portion of the media asset identifier of the search query is below a threshold:
identify a category based on the portion of the media asset identifier of the search query; and
identify an available media asset identifier of the plurality of media asset identifiers that is associated with the identified category; and
provide the identified available media asset identifier of the plurality of media asset identifiers that is associated with the identified category.

12. The system of claim 11, wherein the control circuitry is further configured to display an option to confirm that the subset of the each available media asset identifier of the plurality of media asset identifiers corresponds to the search query.

13. The system of claim 11, wherein the control circuitry when determining the similarity score for each available media asset identifier of the plurality of media asset identifiers is further configured to compare a string of characters in the received search query comprising the portion of the media asset identifier to a string of characters in the each available media asset identifiers of the plurality of media asset identifiers.

14. The system of claim 11, wherein the control circuitry when determining the similarity score for each available media asset identifier of the plurality of media asset identifiers is further configured to compare words in the received search query comprising the portion of the media asset identifier to words in the each available media asset identifiers of the plurality of media asset identifiers.

15. The system of claim 11, wherein determining the similarity score for each available media asset identifier of the plurality of media asset identifiers comprises comparing keywords in the received search query comprising the portion of the media asset identifier to keywords in the each available media asset identifiers of the plurality of media asset identifiers.

16. The system of claim 11, wherein the control circuitry when identifying an available media asset identifier of the plurality of media asset identifiers that is associated with the identified category is further configured to:
assign the each available media asset identifier of the plurality of media asset identifiers to a category based on keywords; and
determine a likelihood the received search query comprising the portion of the media asset identifier is assigned to the same category as the assigned each available media asset identifier of the plurality of media asset identifiers.

17. The system of claim 11, wherein the control circuitry when determining the similarity score for each available media asset identifier of the plurality of media asset identifiers is based at least in part on information retrieved from a user profile.

18. The system of claim 11, wherein the control circuitry when providing the subset of the plurality of media asset identifiers is further configured to determine that the similarity score for the available media asset identifier of the plurality of media asset identifiers exceeds a threshold.

19. The system of claim 11, wherein the control circuitry is further configured to notify a user that the received search query comprising the portion of the media asset identifier does not match any of the each of the available media asset identifiers of the plurality of media asset identifiers.

20. The system of claim 11, wherein the media asset identifier comprises any one or any combination of a title of the media asset, a nickname of the media asset, an abbreviation of the media asset, or a description of the media asset.

* * * * *